United States Patent
Zhang et al.

(10) Patent No.: US 11,093,550 B2
(45) Date of Patent: Aug. 17, 2021

(54) YIELD CRITERIA ESTIMATION

(71) Applicant: THE BOEING COMPANY, Chicago, IL (US)

(72) Inventors: Yunpeng Zhang, Brisbane (AU); Dorival de Moraes Pedroso, Brisbane (AU); Andrew Jon Eugene Stephan, Brisbane (AU); Michael Charles Elford, Springfield (AU)

(73) Assignee: THE BOEING COMPANY, Chicago, IL (US)

( * ) Notice: Subject to any disclaimer, the term of this patent is extended or adjusted under 35 U.S.C. 154(b) by 128 days.

(21) Appl. No.: 16/459,161

(22) Filed: Jul. 1, 2019

(65) Prior Publication Data

US 2021/0004412 A1   Jan. 7, 2021

(51) Int. Cl.
| | |
|---|---|
| *G06F 16/00* | (2019.01) |
| *G06F 16/9032* | (2019.01) |
| *G06F 16/9038* | (2019.01) |
| *G06F 16/9035* | (2019.01) |
| *G06F 16/44* | (2019.01) |
| *G06F 119/22* | (2020.01) |

(52) U.S. Cl.
CPC ...... *G06F 16/90328* (2019.01); *G06F 16/444* (2019.01); *G06F 16/9035* (2019.01); *G06F 16/9038* (2019.01); *G06F 2119/22* (2020.01)

(58) Field of Classification Search
CPC .......... G06F 16/90328; G06F 16/9035; G06F 16/9038
See application file for complete search history.

(56) References Cited

U.S. PATENT DOCUMENTS

| | | | |
|---|---|---|---|
| 2014/0229776 A1* | 8/2014 | Bose ...................... | G01R 31/30 714/718 |
| 2020/0210542 A1* | 7/2020 | Cojocaru ................ | G06F 30/20 |

FOREIGN PATENT DOCUMENTS

| | | | |
|---|---|---|---|
| CN | 103793582 A | * | 5/2014 |
| CN | 104503396 A | * | 4/2015 |

OTHER PUBLICATIONS

Fu, Fu. "Springback Prediction of High-Strength Sheet Metal Under Air Bending Forming and Tool Design Based on GA-BPNN." International journal of advanced manufacturing technology 53.5 (2011): 473-483. Web. (Year: 2011).*

(Continued)

*Primary Examiner* — Diedra McQuitery

(57) ABSTRACT

Yield criteria of a material are estimated by obtaining test data representing anisotropic material properties of the material and performing an iterative evolutionary search to identify parameters of a function descriptive of the yield criteria of the material. The evolutionary search includes determining an error value based on a first data point of a first population, where the first data point representing potential values of the parameters. The evolutionary search also includes performing an evolutionary process to generate a second data point as a candidate for replacing the first data point in a second population and determining a second error value based on the second data point. Either the first data point or the second data point is selected for inclusion in the second population. Output data is generated based on estimated values of the parameters that are identified by the evolutionary search.

20 Claims, 9 Drawing Sheets

(56) References Cited

OTHER PUBLICATIONS

Politis, Politis. "Development of a Computational Optimisation System to Determine Constitutive Equation Constants for Metal Alloys." Proceedings of the Institution of Mechanical Engineers. Part L, Journal of materials, design and applications 233.6 (2017): 1166-1183. Web. (Year: 2017).*

Banabic, D., "Sheet Metal Forming Processes," Constructive Modeling and Numerical Simulation, Springer, 2010, 318 pgs.

Barlat, F., et al., "Plane stress yield function for aluminum alloy sheets—Part 1: theory," International Journal of Plasticity vol. 19, 2003, pp. 1297-1319.

Piyasatian, Napapan, "Differential Evolution—A simple Evolution Strategy for Fast Optimization," <https://jvanderw.une.edu.au/DE_1.pdf> retrieved Jul. 1, 2019, 25 pgs.

* cited by examiner

YIELD CRITERIA ESTIMATION

FIELD OF THE DISCLOSURE

The present disclosure is generally related to estimating yield criteria of a material.

BACKGROUND

Many materials have anisotropic material properties. For example, certain aluminum alloys have highly anisotropic yield criteria. In some situations, it is important to understand and quantify certain anisotropic material properties. For example, engineers designing or controlling fabrication processes that use such materials should understand how and to what extent forces applied to the material will deform the material during fabrication. Likewise, engineers designing parts using such materials should understand how and to what extent forces applied to the material will deform the material during use.

Materials researchers have identified several functions that can be used to estimate anisotropic yield criteria. Generally, these functions include a large number of parameters that are material specific. The typical mechanism to assign values to these parameters is to start with initial guesses for the values of the parameters then use a data fitting process, such as an iterative Newton-Raphson optimization technique, adjust the values of the parameters until the function matches testing data associated with the material. Such data fitting processes need to determinate the gradient or Hessian matrix of the objective function which is computational expensive and sometime it is not analytically available. This results in a rather inflexible or application specific data fitting, which can be problematic since some functions work better (e.g., provide more accurate models of material properties) than other functions for particular materials.

Further, many data fitting processes such as an iterative Newton-Raphson optimization use initial guesses as seed values. If these seed values are not selected carefully, the data fitting process can converge on a poor quality result (e.g., a local best solution rather than the global best solution). In this situation, the data fitting process gives the user a result that is not reliable, but which the user does not know to be unreliable. Users may overdesign components or fabrication processes to account for the possibility that the data fitting process results are unreliable, which leads to waste (e.g., use of excess material).

SUMMARY

In a particular implementation, a computer-implemented method of estimating yield criteria of a material includes using one or more processors to perform operations including obtaining test data representing anisotropic material properties of a material. The operations also include performing an evolutionary search process to identify parameters of a function descriptive of yield criteria of the material. The evolutionary search process is performed iteratively until an iteration criterion is satisfied. The evolutionary search process includes designating a plurality of data points to form a population of data points, where each data point of the plurality of data points represents potential values of the parameters. The evolutionary search process also includes determining a first error value indicative of how closely the function represents the test data when the potential values represented by a first data point of the population of data points are used as the parameters of the function. The evolutionary search process further includes performing, based on the first population of data points, one or more evolutionary processes to generate a second data point as a candidate for replacing the first data point in a second population of data points. The evolutionary search process also includes determining a second error value indicative of how closely the function represents the test data when potential values represented by the second data point are used as the parameters of the function. The evolutionary search process further includes selecting, based on a comparison of the first error value and the second error value, either the first data point or the second data point for inclusion in the second population of data points. The operations also include, in response to determining that the iteration criterion is satisfied, generating output data based on estimated values of the parameters that are identified by performing the operations.

In another particular implementation, a computer-readable storage medium stores instructions that are executable by one or more processors to cause the one or more processors to perform operations to estimate yield criteria of a material. The operations include obtaining test data representing anisotropic material properties of a material. The operations also include performing an evolutionary search process to identify parameters of a function descriptive of yield criteria of the material. The evolutionary search process is performed iteratively until an iteration criterion is satisfied. The evolutionary search process includes designating a plurality of data points to form a first population of data points, where each data point of the plurality of data points represents potential values of the parameters. The evolutionary search process also includes determining a first error value indicative of how closely the function represents the test data when the potential values represented by a first data point of the first population of data points are used as the parameters of the function. The evolutionary search process further includes performing, based on the first population of data points, one or more evolutionary processes to generate a second data point as a candidate for replacing the first data point in a second population of data points. The evolutionary search process also includes determining a second error value indicative of how closely the function represents the test data when potential values represented by the second data point are used as the parameters of the function. The evolutionary search process further includes selecting, based on a comparison of the first error value and the second error value, either the first data point or the second data point for inclusion in the second population of data points. The operations also include, in response to determining that the iteration criterion is satisfied, generating output data based on estimated values of the parameters identified by performing the operations.

In another particular implementation, a system for estimate yield criteria of a material includes one or more processors and one or more memory devices accessible to the one or more processors. The one or more memory devices store instructions that are executable by the one or more processors to cause the one or more processors to perform operations including obtaining test data representing anisotropic material properties of a material. The operations also include performing an evolutionary search process to identify parameters of a function descriptive of yield criteria of the material. The evolutionary search process is performed iteratively until an iteration criterion is satisfied. The evolutionary search process includes designating a plurality of data points to form a first population of data points, where each data point of the plurality of data points represents potential values of the parameters. The evolutionary search process also includes determining a first error value indicative of how closely the function represents the test data when the potential values represented by a first data point of the first population of data points are used as the parameters of the function. The evolutionary search process further includes performing, based on the first population of data points, one or more evolutionary processes to generate a second data point as a candidate for replacing the first data point in a second population of data points. The evolutionary search process also includes determining a second error value indicative of how closely the function represents the test data when potential values represented by the second data point are used as the parameters of the function. The evolutionary search process further includes selecting, based on a comparison of the first error value and the second error value, either the first data point or the second data point for inclusion in the second population of data points. The operations also include, in response to determining that the iteration criterion is satisfied, generating output data based on estimated values of the parameters identified by performing the operations.

DETAILED DESCRIPTION

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 5, multiple error values 134A and 134B are shown. When referring to a particular one of these error values, such as the error value 134A, the distinguishing letter "A" is used. However, when referring to any arbitrary one of these error values or to these error values as a group, the reference number 134 is used without a distinguishing letter.

Figure 1:
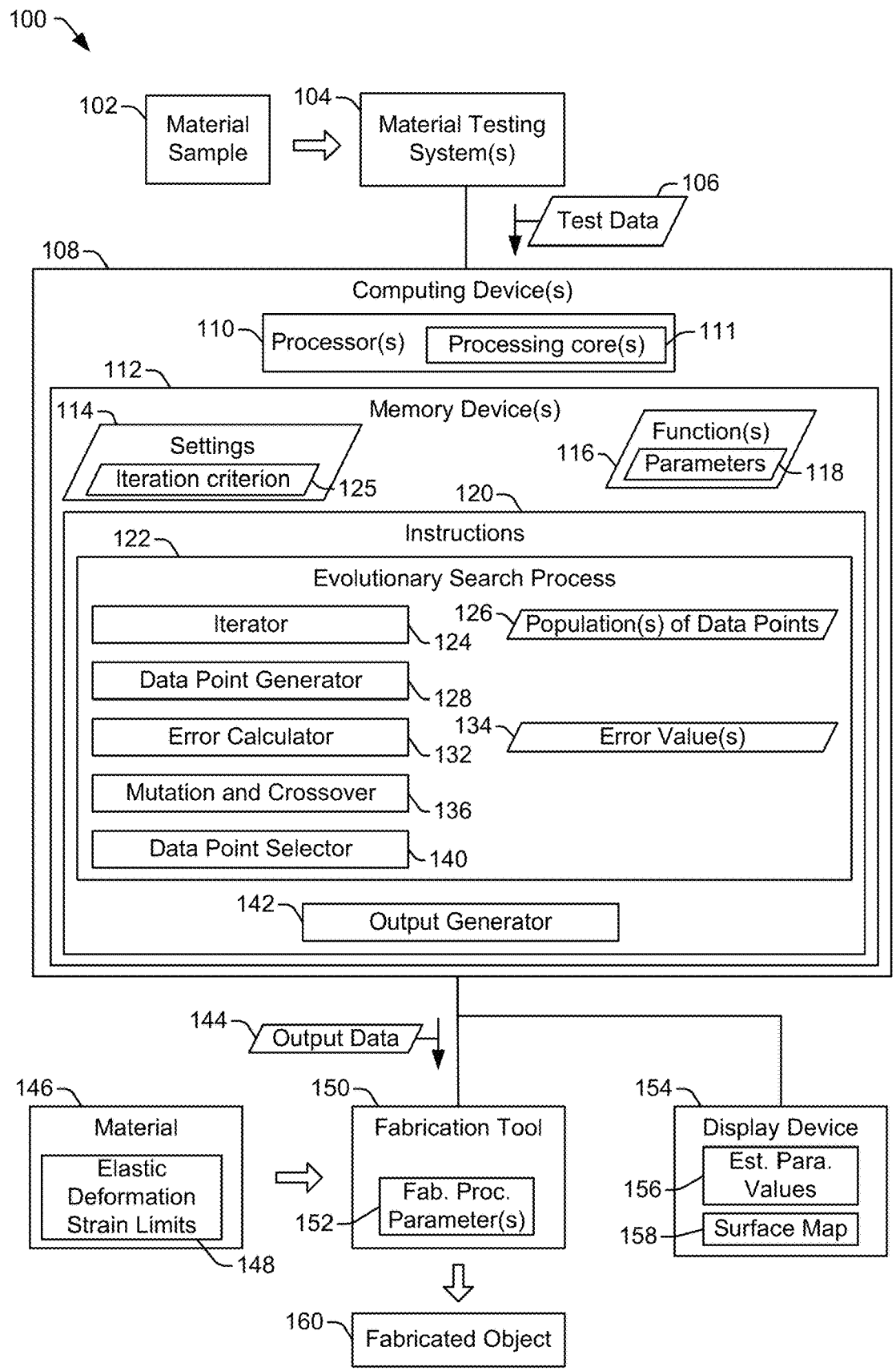
FIG. 1 is a block diagram that illustrates an example of a system for estimating yield criteria of a material according to a particular implementation.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more computing devices ("computing device(s)" 108 in FIG. 1), which indicates that in some implementations the system 100 includes a single computing device 108 and in other implementations the system 100 includes multiple computing devices 108. For ease of reference herein, such features are generally introduced as "one or more" features, and are subsequently referred to in the singular.

The terms "comprise," "comprises," and "comprising" are used interchangeably with "include," "includes," or "including." Additionally, the term "wherein" is used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. Such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively)

include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

In the following description, certain values are described as being selected or determined randomly. The term "randomly" and related terms that use "random" as a stem (e.g., randomize, etc.) are used herein to indicate values are determined using a generally stochastic operation. Such operations can include, for example, pseudo-random operations such as those that are generally performed by so-called "random-number generators" used by many computing devices.

The following description makes frequent reference to evolutionary processes. As used herein, "evolutionary processes" are operations that manipulate data in a manner that mimics modification, inheritance, and survival features of natural processes. Evolutionary processes, as used herein, generally use mutation, crossover, and selection operations on an initial data set (referred to herein as a "population of data points") to generate a new data set. Mutation in this context refers to modifying the data set (e.g., one or more data points within the data set) in a manner that is structured, random within defined parameters, or structured with some random aspects. For example, in an implementation disclosed herein, a structured process of mutation is used; however, the data points within the data set that are used in the structured process are randomly selected. Crossover in this context refers to intermixing aspects of two or more data points of the data set. For example, in an implementation disclosed herein, each data point corresponds to or can be represented by a vector including multiple values, and crossover is performed by generating a new data point (e.g., a new vector) that includes values from each of two or more other data points. Selection in the context of evolutionary processes refers to determining which of two or more data points is to be included in a subsequent data set (e.g., the next population of data points). The selection can be structured (e.g., a data point with a smallest error value is selected), random, or structured with random aspects (e.g., error values of data points are randomly weighted before selection based on the error values).

The following description also makes frequent reference to evolutionary search processes. An evolutionary search process is a set of search or optimization operations that include evolutionary processes. For example, an evolutionary search process uses evolutionary processes to generate a sequence of data sets (e.g., populations of data points) to converge toward a result. One advantage of evolutionary search processes, as compared to more traditional optimization processes, such as Newton-Raphson optimization techniques, is that evolutionary search processes do not need to calculate the gradient or Hessian matrix of the objective function which are computational expensive. A technical benefit of which is that if a particular yield criteria function does not describe material properties of a particular material well, the evolutionary search process do not need to be modified to use a different yield criteria function. Further, the function used in an evolutionary search process does not need to be differentiable whereas Newton-Raphson optimization techniques only work with differentiable functions. Finally, various operations used for evolutionary search processes are easy to be performed in parallel, which can significantly improve efficiency of use of computing resources.

The yield criteria of a material describe how the material will respond to particular stresses. There are many situations where it can be important to have an understanding of the yield criteria of a material. For example, when an object is being fabricated by shaping the material, the material is often subjected to stresses sufficient to cause plastic deformation of the material. Accordingly, it is important to understand the types and magnitudes of stresses that can be applied to plastically deform the material. As another example, when an object formed of the material is to be subjected to a load, it is often important to ensure that the load applied to the object does not cause plastic deformation of the material. In both of these examples, the yield criteria of the material can be referenced to indicate how much stress is needed to cause plastic deformation. Accordingly, it can be important to understand the yield criteria of the material both for fabrication and use of the material.

Some materials have anisotropic yield criteria. For such materials, how much stress is needed to plastically deform the material depends on how the stress is applied to the material (e.g., the direction of an applied force relative to a sample of the material). Anisotropic yield criteria can be mapped to a yield surface which represents a surface in a six-dimensional (6D) space; however, it can be difficult and time consuming to determine the various parameters needed to specify the yield surface. For example, significant processing resources can be used to determine or approximate the gradient or the Hessian matrix of the objective function when using Newton-Raphson optimization process to search the values of the parameters. Additionally, initial guesses of the values need to be provided to use the Newton-Raphson optimization process, and poor initial guesses can cause the process to generate suboptimal (e.g., poor estimated) results.

The present disclosure provides an improved method of estimating yield criteria of a material. The disclosed yield criteria estimation operations can be performed without the need of computing the gradient of the objective function and can provide global optimal (theoretically more accurate) results. Additionally, many of the operations disclosed herein to estimate the yield criteria can be parallelized to further speed up the estimation process. As a result, manufacturing processes that use the material can be improved, and the material can more readily and more reliably be used to fabricate components. For example, operating parameters of a manufacturing process can be set based on the yield criteria to reduce rework and waste. To illustrate, when metal is roll formed, the resulting metal sheet typically has anisotropic yield characteristics. If the metal sheet is subsequently used in a manufacturing process to form a component, information describing the yield criteria of the metal sheet can be used to control the manufacturing process. As a specific example, if the sheet metal sheet is used in an incremental sheet forming process, the yield criteria can be used to plan a tool path for a stylus or other fabrication tool that is used to shape the metal sheet. Understanding the yield criteria of the material and forces applied to the metal sheet over time and at various locations enables selection of an appropriate tool path to enable shaping the metal sheet, while accounting for spring back of the metal sheet.

FIG. 1 is a block diagram that illustrates an example of a system 100 for estimating yield criteria of a material 146 according to a particular implementation. The system 100 includes one or more computing devices 108 configured to perform operations to estimate the yield criteria of the material 146. In FIG. 1, the system 100 also includes one or more material testing systems 104 configured to generate test data 106 based on a material sample 102 and a fabrication tool 150 configured to generate a fabricated object 160 using the material 146.

Although the material testing system 104 and the fabrication tool 150 are coupled to the computing device 108 in FIG. 1, in other implementations, the material testing system 104, the fabrication tool 150, or both, are remote from the computing device 108. For example, the test data 106 can be obtained by the computing device 108 directly from the material testing system 104, via a network connection to the material testing system 104, or from a memory device or another persistent storage device that retains the test data 106 after the test data 106 is generated by the material testing system 104. In some implementations, the test data 106 is obtained from a vendor of the material 146 or from an independent entity, such as a testing laboratory.

As another example, output data 144 representing estimated values of the yield criteria or other values based on the estimated values of the yield criteria can be provided by the computing device 108 directly to the fabrication tool 150, via a network connection to the fabrication tool 150, or can be stored in a memory device or another persistent storage device that is accessible to the fabrication tool 150.

The computing device 108 includes one or more processors 110 and one or more memory devices 112 accessible to the processor 110. Each of the one or more processors 110 includes one or more processing cores 111. The memory device 112 is configured to store data and instructions 120 to estimate the yield criteria of the material 146. For example, in FIG. 1, the memory device 112 stores settings 114, one or more functions 116 to represent the yield criteria, and the instructions 120. The instructions 120 are executable by the processor 110, based on the settings 114, to perform operations to estimate the yield criteria by performing an iterative evolutionary search process to identify values of parameters 118 of a function 116 that cause the function 116 to fit the test data 106, as described further below. Identifying values of the parameters 118 that cause the function 116 to fit the test data 106 is also referred to as calibrating the yield criteria.

In FIG. 1, the instructions 120 are illustrated, for convenience of description, as including various functional blocks of instructions. In the following description, the functional blocks are referenced to describe various operations performed during execution of the instructions 120 according to a particular implementation. In other implementations, the instructions 120 are arranged in a different manner to perform the described operations. Generally, the instructions 120 are executable by the processor 110 to obtain the test data 106 and to perform an evolutionary search process to generate the output data 144. In some implementations, portions of the instructions 120 are executed in parallel by multiple processing cores 111 of the processor 110. For example, a single multi-core processor 110 can execute portions of the instructions 120 in parallel using different processing cores 111. In another example, several distinct processors 110 can execute portions of the instructions 120 in parallel using different processing cores 111. Parallel execution of the instructions 120 can include executing instructions associated with one functional block (e.g., data point generator instructions 128) concurrently with executing instructions associated with another functional block (e.g., error calculator instructions 132). Alternatively, or in addition, parallel execution of the instructions 120 can include concurrent execution of multiple instances of a single functional block of instructions (e.g., multiples instances of the data point generator instructions 128).

In the implementation illustrated in FIG. 1, the instructions 120 include evolutionary search process instructions 122 and output generator instructions 142. The evolutionary search process instructions 122 include iterator instructions 124, data point generator instructions 128, error calculator instructions 132, mutation and crossover instructions 136, and data point selector instructions 140. In other implementations, the evolutionary search process instructions 122 include additional functional blocks of instructions, fewer functional blocks of instructions, or different functional blocks of instructions. For example, in some implementations, the instructions 120 include a randomizer block of instructions to generate various randomized values used during execution of the instructions 120.

In a particular implementation, as explained further below, the evolutionary search process instructions 122 are executable to perform a differential evolution process to reduce (e.g., minimize) a result of an objective function. The differential evolution process reduces the result of the objective function by modifying one or more data points of one or more populations of data points 126 using evolutionary processes, such as mutation, crossover, and selection. The evolutionary processes replace some data points of a first population of data points 126 with evolutionarily-determined data points to generate a new population of data points 126 (e.g., a second population of data points 126). In such implementations, the result of the objective function is an error value 134 representing how closely the function 116 describes the test data 106 when particular parameters 118 (indicated by a data point) are used in the function 116.

Various operations performed by the evolutionary search process instructions 122 are performed iteratively until an iteration criterion 125 is satisfied. The iterator instructions 124 are executable to determine whether the iteration criterion 125 is satisfied and to stop iteration of the operations when the iterator instructions 124 determine that the iteration criterion 125 is satisfied. In some implementation, the settings 114 include more than one iteration criterion 125 and the iterator instructions 124 check more than one iteration criterion 125. For example, the iterator instructions 124 can check two iteration criteria 125 and can stop iteration of operations in response to determining that either (or both) iteration criteria 125 are satisfied. The iteration criterion 125 can specify, for example, an iteration count threshold, a convergence threshold, another threshold, or a combination thereof. To illustrate, when the iteration criterion 125 specifies an iteration count threshold, the iteration criterion 125 is satisfied when a count of iterations performed is equal to or greater than a number of iterations indicated by the iteration count threshold. As another illustrative example, when the iteration criterion 125 specifies a convergence threshold, the iteration criterion 125 is satisfied when an error value associated with the estimated parameter values 156 is less than or equal to a threshold error value.

The data point generator instructions 128 are executable to generate a plurality of data points to form the population of data points 126. In a particular implementation, the data points are designated or determined by randomly selecting points from a specified range of an N-dimensional feature space, where N is equal to the number of the parameters 118 of the function 116. For example, several functions 116 to describe anisotropic yield criteria of the material 146 include eighteen (18) parameters 118 (i.e., N=18).

As a first example, the function 116 to describe the anisotropic yield criteria of the material 146 can include or correspond to an extension of a Drucker yield criterion as represented by Equation 1 below:

$$F = \hat{J}_2^3 - c_0 \hat{J}_3^2 = 27\left(\frac{\sigma_y}{3}\right)^6 \quad \text{Equation 1}$$

where $\sigma_y$ is the yield stress related to isotropic hardening, $\hat{J}_2$ is the modified second invariant of the stress deviator given by the Equation 2 below, and $\hat{J}_3$ is the modified third invariant of the stress deviator given by the Equation 3 below:

$$\hat{J}_2 = \frac{a_1}{6}(\sigma_x - \sigma_y)^2 + \frac{a_2}{6}(\sigma_y - \sigma_z)^2 + \frac{a_3}{6}(\sigma_x - \sigma_z)^2 + a_4\sigma_{xy}^2 + a_5\sigma_{xz}^2 + a_6\sigma_{yz}^2 \quad \text{Equation 2}$$

$$\hat{J}_3 = \frac{\sigma_x^3}{27}(b_1 + b_2) + \frac{\sigma_y^3}{27}(b_3 + b_4) + \frac{\sigma_z^3}{27}[2(b_1 + b_4) - b_2 - b_3] - \frac{\sigma_x^2}{9}(b_1\sigma_y + b_2\sigma_z) - \frac{\sigma_y^2}{9}(b_3\sigma_z + b_4\sigma_x) - \frac{\sigma_z^2}{9}[(b_1 - b_2 + b_4)\sigma_x + (b_1 - b_3 + b_4)\sigma_y] + \frac{2\sigma_x\sigma_y\sigma_z}{9}(b_1 + b_4) - \frac{\sigma_{xz}^2}{3}[2b_9\sigma_y - b_8\sigma_z - (2b_9 - b_8)\sigma_x] - \frac{\sigma_{xy}^2}{3}[2b_{10}\sigma_z - b_5\sigma_y - (2b_{10} - b_5)\sigma_x] - \frac{\sigma_{yz}^2}{3}[-b_6\sigma_y - b_7\sigma_z + (b_6 - b_7)\sigma_x] + 2b_{11}\sigma_{xy}\sigma_{yz}\sigma_{xz} \quad \text{Equation 3}$$

where $\sigma_x$ is the stress in an x-direction (e.g., a rolling direction for a roll forming process), $\sigma_y$ is the stress in a y-direction (e.g., a transverse direction for the roll forming process), $\sigma_z$ is the stress in a z-direction (e.g., a normal direction for the roll forming process), $\sigma_{xy}$, $\sigma_{yz}$, and $\sigma_{xz}$ are shear stresses, and $a_1$, $a_2$, $a_3$, $a_4$, $a_5$, $a_6$, $b_1$, $b_2$, $b_3$, $b_4$, $b_5$, $b_6$, $b_7$, $b_8$, $b_9$, $b_{10}$, $b_{11}$, and $c_0$ are the parameters 118 of the first example of the function 116. In some implementations, the $c_0$ parameter is constrained to values such that $$-\frac{27}{8} < c_0 < \frac{18}{8}.$$

In the first example, each data point of the population of data points 126 can be represented by a vector including eighteen (18) elements corresponding to the parameters 118: $a_1$, $a_2$, $a_3$, $a_4$, $a_5$, $a_6$, $b_1$, $b_2$, $b_3$, $b_4$, $b_5$, $b_6$, $b_7$, $b_8$, $b_9$, $b_{10}$, $b_{11}$, and $c_0$.

A second example of a function 116 to describe the anisotropic yield criteria of the material 146 suitable for use herein is based on two linear transformations of a stress deviator and is represented by Equation 4 below:

$$F = |\tilde{S}'_1 - \tilde{S}''_1|^a + |\tilde{S}'_1 - \tilde{S}''_2|^a + |\tilde{S}'_1 - \tilde{S}''_3|^a + |\tilde{S}'_2 - \tilde{S}''_1|^a + |\tilde{S}'_2 - \tilde{S}''_2|^a + |\tilde{S}'_2 - \tilde{S}''_3|^a + |\tilde{S}'_3 - \tilde{S}''_1|^a + |\tilde{S}'_3 - \tilde{S}''_2|^a + |\tilde{S}'_3 - \tilde{S}''_3|^a = 4\sigma_y^a \quad \text{Equation 4}$$

where the exponent a is dependent on the crystal structure (which can be a fitting parameter) of the material 146 (e.g., a=6 for a body centered cubic crystal structure and a=8 for a face centered cubic crystal structure), and $\tilde{S}'_i$ and $\tilde{S}''_i$ (i=1, 2, 3) are the principal values of the deviatoric stress subject to two linear transformations represented by:

$$\tilde{s}^k = \begin{bmatrix} \tilde{s}_x^{(k)} \\ \tilde{s}_y^{(k)} \\ \tilde{s}_z^{(k)} \\ \tilde{s}_{xy}^{(k)} \\ \tilde{s}_{yz}^{(k)} \\ \tilde{s}_{xz}^{(k)} \end{bmatrix} = \begin{bmatrix} 0 & -C_{12}^{(k)} & -C_{13}^{(k)} & 0 & 0 & 0 \\ -C_{21}^{(k)} & 0 & -C_{23}^{(k)} & 0 & 0 & 0 \\ -C_{31}^{(k)} & -C_{32}^{(k)} & 0 & 0 & 0 & 0 \\ 0 & 0 & 0 & C_{66}^{(k)} & 0 & 0 \\ 0 & 0 & 0 & 0 & C_{44}^{(k)} & 0 \\ 0 & 0 & 0 & 0 & 0 & C_{55}^{(k)} \end{bmatrix} \begin{bmatrix} s_x \\ s_y \\ s_z \\ s_{xy} \\ s_{yz} \\ s_{xz} \end{bmatrix} \quad \text{Equation 5}$$

where the superscript (k) corresponds to either ' or '' in Equation 4, and $C_{ij}^{(k)}$ are the parameters 118 of the function 116.

In the second example, each data point of the population of data points 126 can be represented by a vector including eighteen (18) elements corresponding to the parameters 118: $C'_{21}$, $C'_{31}$, $C'_{12}$, $C'_{32}$, $C'_{13}$, $C'_{23}$, $C'_{66}$, $C'_{44}$, $C'_{55}$, $C''_{21}$, $C''_{31}$, $C''_{12}$, $C''_{32}$, $C''_{13}$, $C''_{23}$, $C''_{66}$, $C''_{44}$, and $C''_{55}$. In some implementations, a of Equation 4 can also be estimated as one of the parameters 118.

When appropriate parameters 118 are used in the respective equations above (e.g., when one of the functions 116 is calibrated to the test data 106), the function 116 is descriptive of the yield criteria of the material 146. To calibrate either the first example or the second example of the functions 116 to the test data 106, the corresponding eighteen parameters 118 have to be identified. In other examples, a function 116 can include fewer than eighteen parameters or more than eighteen parameters. For example, if the material exhibits similar yield characteristics in two dimension, and different yield characteristics in a third dimension, a different function 116 can be used to represent the yield criteria, and the function 116 may include fewer than eighteen parameters.

When either the first example or the second example of the function 116 is used, each data point of the population of data points 126 corresponds to a point in an eighteen dimensional space. Each data point can be represented as a vector including eighteen elements, with each element representing a position along one axis of the eighteen dimensional space. The value of each element represents a value of a corresponding parameter 118. The data point generator instructions 128 generate a data point by selecting values for each element of the vector representing the data point. In some implementations, one or more of the values are selected based on a seed value (e.g., an initial estimate). In other implementations, the values are selected randomly. For example, a value can be randomly selected from a defined range of values. In this example, the initial value of one or more of the parameters 118 selected by the data point generator instructions 128 can be constrained to fall within a particular range. To illustrate, the initial value of a particular parameter 118 can be randomly selected within a range of values of the parameter 118 associated with other similar materials. As another illustrative example, as explained above, the parameter the $c_0$ parameter can be constrained to values such that $$-\frac{27}{8} < c_0 < \frac{18}{8}.$$

In some implementations, multiple instances of the evolutionary search process instructions 122 can be initiated or executed in parallel (e.g., by different processors 110 or different processing cores 111). In some examples of such implementations, the data point generator instructions 128 generate a single initial population of data points 126 and provide the single initial population of data points 126 to each of the multiple instances of the evolutionary search process instructions 122. In other examples of such implementations, the data point generator instructions 128 generate multiple initial populations of data points 126 (e.g., one for each instance of the evolutionary search process instructions 122) and provide each instance of the evolutionary search process instructions 122 with its own respective initial population of data points 126. For example, the data point generator instructions 128 can generate a first population of data points 126 for a first instance of the evolutionary search process instructions 122 and can generate a second population of data points 126 for a second instance of the evolutionary search process instructions 122, where the first population of data points 126 is different from the second population of data points 126.

After a population of data points 126 is designated for a particular instance of the evolutionary search process instructions 122, a particular data point (referred to herein as a "first data point" or "parent data point" for convenience of reference) is selected from the population of data points 126, and the error calculator instructions 132 determine an error value 134 indicative of how closely the function 116 represents the test data 106 when the potential values represented by the first data point are used as the parameters 118 of the function 116. In this context, "potential values" of the parameters 118 refers to values of the parameters 118 that are being tested or evaluated in the function 116 to determine whether use of these values causes the function 116 to represent the test data 106 with sufficient accuracy. In some implementations, the error calculator instructions 132 determine error values 134 for each data point of the population of data points 126. To illustrate, if the population of data points 126 includes one thousand data points, the error calculator instructions 132 calculate one thousand error values 134.

In a particular implementation, the error calculator instructions 132 calculate the error values 134 according to the following equations:

Error value = $E_\sigma \cdot E_r + E_\sigma + E_r$  Equation 6 where $E_\sigma$ and $E_r$ are defined according to the following:

$$E_\sigma = \sum_k w_k \left( \frac{\frac{\sigma_k^m}{\sigma_0^m} - \frac{\sigma_k^e}{\sigma_0^e}}{\max\left(\frac{\sigma_\theta^e}{\sigma_0^e}\right) - \min\left(\frac{\sigma_\theta^e}{\sigma_0^e}\right)} \right)^2$$  Equation 7

$$E_r = \sum_l w_l \left( \frac{\frac{r_k^m}{r_0^m} - \frac{r_k^e}{r_0^e}}{\max\left(\frac{r_\theta^e}{r_0^e}\right) - \min\left(\frac{r_\theta^e}{r_0^e}\right)} \right)^2$$  Equation 8 where the superscript e stands for the corresponding experimental of polycrystal model data (e.g., the test data 106), $w_k$ and $w_l$ are weighting factors (which can be optimized based on testing), and $\sigma_k^m$ is a vector representing flow stresses of the yield criterion (e.g., $\sigma_k^m = [\sigma_\theta^m, \sigma_b^m, \sigma_{tyz}^m, \sigma_{txz}^m, \sigma_{syz}^m, \sigma_{sxz}^m]$). In the vector representation of $\sigma_k^m$, $\sigma_\theta^m$ is the uniaxial tension at θ degrees from the rolling direction (e.g., $\sigma_0^m$ is the tension flow stress in the rolling direction). The remaining elements of $\sigma_k^m$ are defined according to the following:

$$\frac{\sigma_\theta^m}{\sigma_y} = \frac{\sigma_\theta^m}{\sigma_y(\sigma_x, \sigma_y, \sigma_z, \sigma_{xy}, \sigma_{yz}, \sigma_x z)} = \frac{\sigma_\theta^m}{\sigma_y(\sigma_\theta^m \cos^2\theta, \sigma_\theta^m \sin^2\theta, 0, \sigma_\theta^m \cos\theta\sin\theta, 0, 0)}$$  Equation 9

$$\frac{\sigma_b^m}{\sigma_y} = \frac{\sigma_b^m}{\sigma_y(\sigma_x, \sigma_y, \sigma_z, \sigma_{xy}\sigma_{yz}, \sigma_x z)} = \frac{\sigma_b^m}{\sigma_y(0, 0, \sigma_b^m, 0, 0, 0)}$$  Equation 10

$$\frac{\sigma_{tyz}^m}{\sigma_y} = \frac{\sigma_{tyz}^m}{\sigma_y(\sigma_x, \sigma_y, \sigma_z, \sigma_{xy}, \sigma_{yz}, \sigma_x z)} = \frac{\sigma_{tyz}^m}{\sigma_y\left(0, \frac{1}{2}\sigma_{tyz}^m, \frac{1}{2}\sigma_{tyz}^m, 0, \frac{1}{2}\sigma_{tyz}^m, 0\right)}$$  Equation 11

$$\frac{\sigma_{txz}^m}{\sigma_y} = \frac{\sigma_{txz}^m}{\sigma_y(\sigma_x, \sigma_y, \sigma_z, \sigma_{xy}, \sigma_{yz}, \sigma_x z)} = \frac{\sigma_{txz}^m}{\sigma_y\left(\frac{1}{2}\sigma_{txz}^m, 0, \frac{1}{2}\sigma_{txz}^m, 0, 0, \frac{1}{2}\sigma_{txz}^m\right)}$$  Equation 12

$$\frac{\sigma_{syz}^m}{\sigma_y} = \frac{\sigma_{syz}^m}{\sigma_y(\sigma_x, \sigma_y, \sigma_z, \sigma_{xy}, \sigma_{yz}, \sigma_x z)} = \frac{\sigma_{syz}^m}{\sigma_y(0, 0, 0, 0, \sigma_{syz}^m, 0)}$$  Equation 13

$$\frac{\sigma_{sxz}^m}{\sigma_y} = \frac{\sigma_{sxz}^m}{\sigma_y(\sigma_x, \sigma_y, \sigma_z, \sigma_{xy}, \sigma_{yz}, \sigma_x z)} = \frac{\sigma_{sxz}^m}{\sigma_y(0, 0, 0, 0, 0, \sigma_{sxz}^m)}$$  Equation 14 where $\sigma_b^m$ is the in-plane balanced biaxial tension, $\sigma_{tyz}^m$ is the 45° tension stress in (y-z, transverse-normal direction) plane, $\sigma_{txz}^m$ is the 45° tension stress in (x-z, rolling-normal direction) plane, $\sigma_{syz}^m$ is the simple shear stress in (y-z, transverse-normal direction) plane, $\sigma_{sxz}^m$ is the simple shear stress in (x-z, rolling-normal direction) plane.

In Equation 8, $r_k^m = [r_\theta^m, r_b^m]$ is a modelling R-value given by the plastic yield criteria of the material 146. The R-value at the θ-degree from the rolling direction is defined according to the following:

$$r_\theta^m = -1 - \left( \sigma_y^{-1} \frac{\partial \sigma_y}{\partial \sigma_z}(\cos^2\theta, \sin^2\theta, 0, \cos\theta\sin\theta, 0, 0) \right)^{-1}$$  Equation 15 where the R-value given by the balanced biaxial tension is defined according to the following:

$$r_b^m = -1 - \left( \sigma_y^{-1} \frac{\partial \sigma_y}{\partial \sigma_z}(0, 0, 1, 0, 0, 0) \right)^{-1}$$  Equation 16

In some implementations, after the error value 134 of the first data point is determined, the error value 134 can be compared to a convergence threshold of the iteration criterion 125 by the iterator instructions 124 to determine whether the error value 134 is sufficiently small such that the values of the first data point can be used as estimated parameter values 156. During an initial iteration of the evolutionary search process instructions 122, it is unlikely that the error value 134 will satisfy the convergence threshold; however, with each iteration, the error value 134 of a tested data point should decrease relative to previous iterations. After a number of iterations, if the error value 134 satisfies the convergence threshold, the evolutionary search process instructions 122 is stopped, and the values of the tested data point are used as the estimated parameter values 156.

Figure 2A:
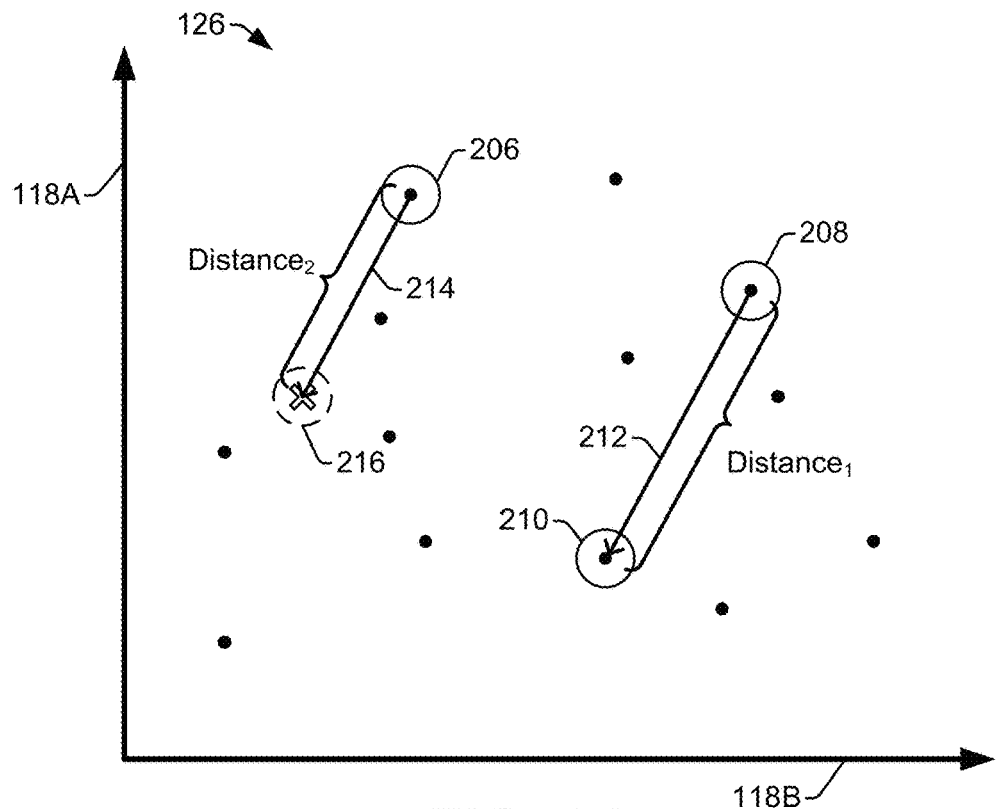
FIGS. 2A and 2B are diagrams illustrating aspects of evolutionary processes used during an evolutionary search process to estimate yield criteria of a material according to a particular implementation.
Figure 2B:
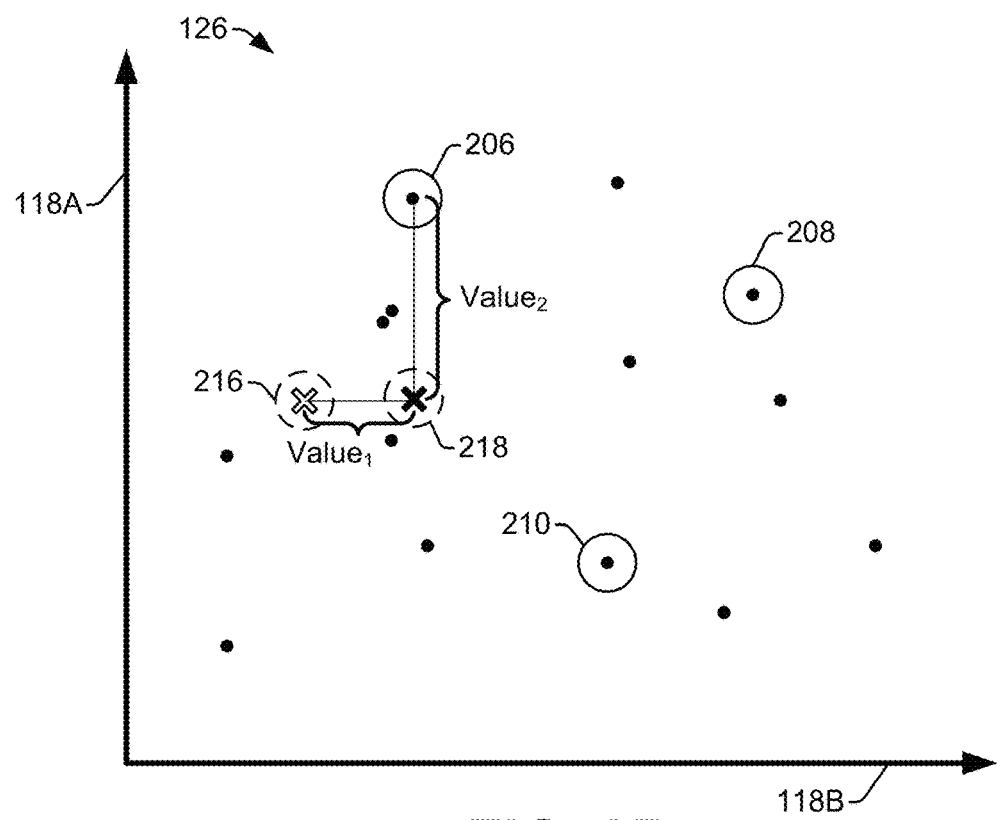
Figure 6:
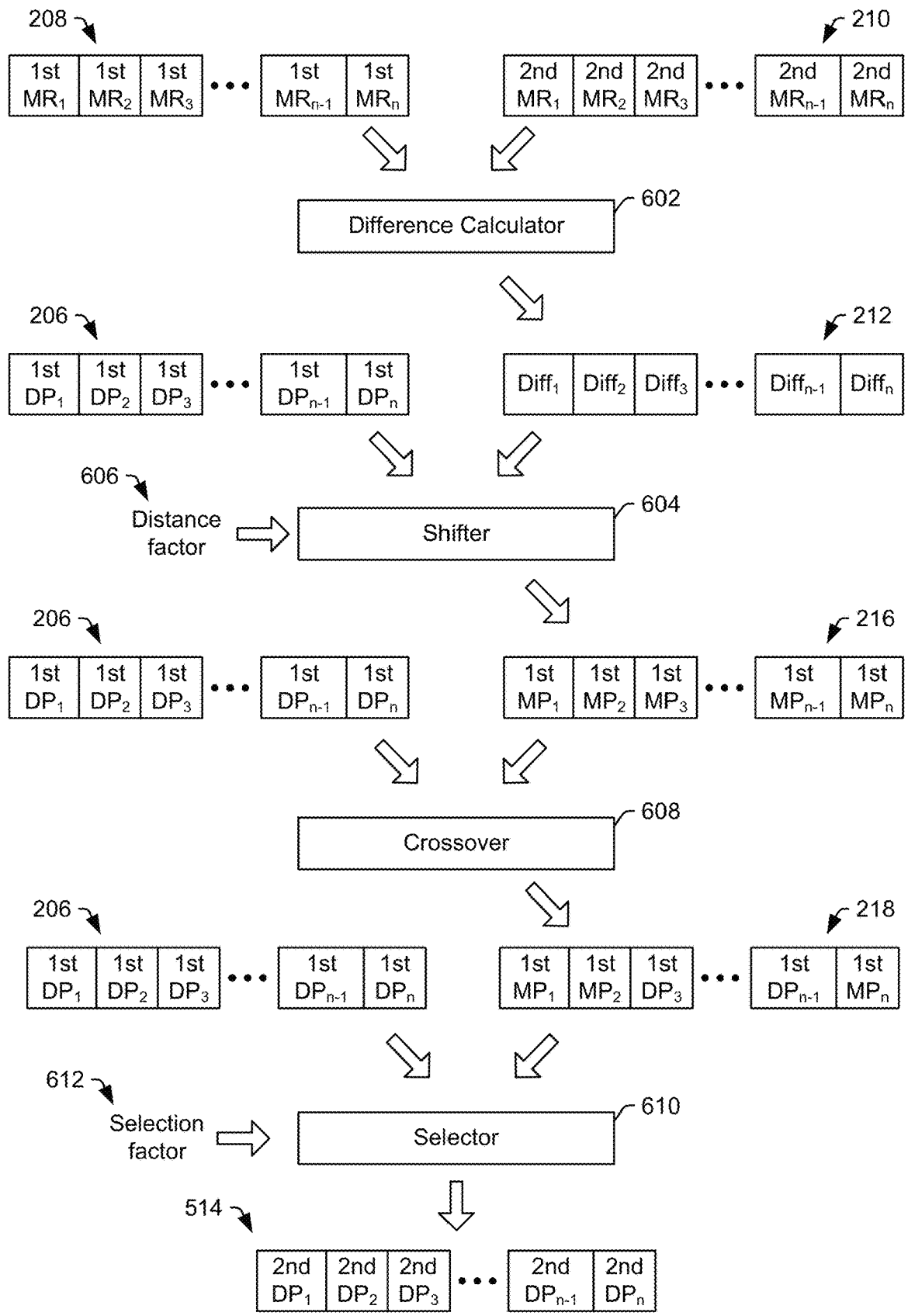
FIG. 6 is a diagram illustrating data and operations of evolutionary processes used in an evolutionary search process to estimate yield criteria of a material according to a particular implementation.

If error value 134 fails to satisfy (e.g., is greater than or greater than or equal to) the convergence threshold, execution of the evolutionary search process instructions 122 continues with the mutation and crossover instructions 136 performing one or more evolutionary processes (e.g., mutation and crossover) to generate another data point (referred to herein as a "second data point," a "child data point," or a "candidate data point" for convenience of reference) as a candidate for replacing the first data point in a second population of data points 126. In a particular implementation, the mutation and crossover instructions 136 are executable to determine a mutation data point by shifting a location of the first data point based on a distance and direction between two other data points of the population of data points 126. In this implementation, the first data point and the mutation data point are used to generate the second data point as a candidate to replace the first data point. The data point selector instructions 140 are executed to select either the first data point or the second data point as a member of a population of data points 126 to be used in a subsequent iteration. Details of the operations performed by the mutation and crossover instructions 136 according to a particular example are illustrated in FIGS. 2A, 2B and 6 and described further below.

Generally, each population of data points 126 generated by the evolutionary search process instructions 122 is a better estimate of the parameter 118. Eventually, either the convergence threshold of the iteration criterion 125 is satisfied or the number of iterations performed satisfies an iteration count threshold of the iteration criterion 125. In either case, the execution of the evolutionary search process instructions 122 is stopped, and a result (e.g., the estimated parameter values 156) is passed to the output generator instructions 142. In a particular implementation, the output generator instructions 142 generate the output data 144 based on the result of the evolutionary search process instructions 122.

The output data 144 generated by the output generator instructions 142 can be provided to the fabrication tool 150, to a display device 154, or both. For example, the output data 144 can include (or can be used to control or design) fabrication process parameters 152 determined based on yield criteria corresponding to the estimated parameter values 156. In this example, the fabrication process parameters 152 specify how the fabrication tool 150 is to manipulate the material 146 to form the fabricated object 160. To illustrate, in some implementations, the fabrication process parameters 152 include a tool path that a tool head (e.g., a stylus) of the fabrication tool 150 is to follow during an incremental sheet forming process. In other implementations, the fabrication process parameters 152 include other parameters that control relative movement or orientation of the material 146 and the fabrication tool 150 to ensure that anisotropic material properties of the fabricated object 160 are aligned in a particular manner. In another example, the output data 144 include or indicate the estimated parameter values 156 of the function 116, a surface map 158 of a yield surface, another graphic representation of the yield criteria, or a combination thereof.

Unlike traditional optimization processes, such as Newton-Raphson optimization, the evolutionary search process instructions 122 do not need to calculate the derivative or Hessian matrix of the objective function (e.g., Equation 6) which is computational expensive in order to determine the estimated parameter values 156. A technical benefit of the evolutionary search process 122, as compared to the classical optimization processes, is that the evolutionary search process 122 is more flexible and efficient at estimating the parameter values 156 of the objective function, even if the derivative of the objective function is unknown. Additionally, the Newton-Raphson optimization requires use of good initial guesses in order to converge on reliable estimated parameter values; whereas a technical benefit of the evolutionary search process instructions 122 is that the evolutionary search process instructions 122 can converge on useful estimated parameter values 156 without the use of any initial guesses. In this manner, the disclosed operations of the evolutionary search process instructions 122 reduce computing time required to identify reliable estimated parameter values 156 and corresponding yield criteria of the material 146. Additionally, various operations of the disclosed evolutionary search process instructions 122 are easy to be implemented in parallel, which can enable the evolutionary search process instructions 122 to converge on useful estimated parameter values 156 more quickly and/or with more efficient use of computing resources than traditional optimization processes.

FIGS. 2A and 2B are diagrams illustrating aspects of an evolutionary search process to estimate yield criteria of a material according to a particular implementation. In particular, FIGS. 2A and 2B illustrate aspects of a differential evolution process performed by execution of the mutation and crossover instructions 136. FIGS. 2A and 2B illustrate a population of data points 126 in a two-dimensional space in which each dimension corresponds to a value of a parameter 118 of the function 116. Each data point of the population of data points 126 can be represented as a vector including two elements: a first element indicting a value of a first parameter 118A and a second element indicating a value of a second parameter 118B. As explained above, in a typical implementation, the functions 116 include more than two parameters 118; however FIGS. 2A and 2B are simplified relative to such typical implementations to illustrate the operations described below.

In the example illustrated in FIGS. 2A and 2B, the mutation and crossover instructions 136 select three distinct data points from among the population of data points 126. In FIG. 2A, the three distinct data points include a parent data point 206, a first mutation reference data point 208, and a second mutation reference data point 210. As explained below, the three distinct data points are used to generate a child data point 218 (shown in FIG. 2B) as a candidate to replace the parent data point 206 in a new population of data points.

In a particular implementation, each data point of the population of data points 126 is used as the parent data point 206 during a single iteration of the evolutionary search process instructions 122. In this implementation, if the population of data points 126 includes one thousand data points, one thousand candidate data points are determined during each iteration of the evolutionary search process instructions 122. The first mutation reference data point 208 and the second mutation reference data point 210 used for each parent data point 206 are selected randomly from among the first population 126.

As shown in FIG. 2A, a difference vector 212 is determined based on the first mutation reference data point 208 and the second mutation reference data point 210. The difference vector 212 indicates a first distance (Distance$_1$) between the first mutation reference data point 208 and the second mutation reference data point 210. The difference vector 212 also indicates a first direction between the first mutation reference data point 208 and the second mutation reference data point 210.

The difference vector 212 is used to determine a mutation vector 214. The mutation vector 214 is oriented in the same direction (e.g., the first direction) as the difference vector 212. Stated another way, the mutation vector 214 is parallel to the difference vector 212 as illustrated in FIG. 2A. The mutation vector 214 also indicates a second distance (Distance$_2$) which is less than or equal to the first distance (Distance$_1$). For example, the mutation and crossover instructions 136 can determine the second distance by multiplying the first distance by a shift factor indicated in the settings 114 of FIG. 1 or randomly selected such that 0<shift factor≤1.

The mutation vector 214 is used to generate a mutation data point 216. The mutation data point 216 is illustrated as an X in FIG. 2A to indicate that the mutation data point 216 is not one of the original data points of the population of data points 126. The mutation data point 216 is determined by shifting the parent data point 206 based on the mutation vector 214 (e.g., by shifting the parent data point 206 by the second distance in the first direction).

FIG. 2B illustrates determining the child data point 218 based on the mutation data point 216 and the parent data point 206. The child data point 218 is determined using element-by-element crossover of the mutation data point 216 and the parent data point 206. For example, in the simplified example illustrated in FIGS. 2A and 2B, each data point corresponds to or is represented by a vector including two elements corresponding to a value of the first parameter 118A and a value of the second parameter 118B. In this example, the child data point 218 corresponds to or is represent by a vector including two elements, and the value assigned to each element is randomly selected between the corresponding values of the parent data point 206 and the mutation data point 216. To illustrate, in FIG. 2B, the mutation data point 218 has a first value (Value$_1$) corresponding to the value of the first parameter 118A of the mutation data point 216 and has a second value (Value$_2$) corresponding to the value of the second parameter 118B of the parent data point 206. When each data point includes eighteen elements, as in the example described with reference to FIG. 1, the value assigned to each element is randomly selected (e.g., eighteen random selections are used) from between the corresponding value of the parent data point 206 and the corresponding value of the mutation data point 216.

After the child data point 218 is determined, an error value is determined for the child data point 218 as described with reference to FIG. 1. If a subsequent iteration of the evolutionary search process is to be performed, either the child data point 218 or the parent data point 206 is selected for inclusion in a population of data points used in the subsequent iteration. In some implementations, the error value of the parent data point 206 is compared to the error value of the child data point 218 and the data point 206 or 218 with the lower error value is included in the next population of data points. In other implementations, selection of the parent data point 206 or the child data point 218 is based on the error values and based on a randomly selected value, referred to herein as a selection factor. For example, the selection factor can be used to weight one (or both) of the error values before the data point with the lower error value is selected. To illustrate, the selection can be performed based on:

$$\min \begin{cases} \text{Selection\_factor} * \text{Error\_Value}_1 \rightarrow Datapoint_1 \\ (1 - \text{Selection\_factor}) * \text{Error\_Value}_2 \rightarrow Datapoint_2 \end{cases}$$

The mutation data point 216 is no further from the parent data point 206 in the first direction than two other points (e.g., the mutation reference data points 208, 210) of the population of data points 126 are from one another. Further, the value of each element of the child data point 218 is equal to a corresponding value of the parent data point 206 or of the mutation data point 216. As a result, the differential evolution operations described above tend to shrink the spatial distribution of the population of data points 126 with each iteration. Randomizing selection between the parent data point 206 and the child data point 218 introduces some jitter into this convergence to reduce a likelihood of converging on a local minimum. The selection between the parent data point 206 and the child data point 218 can be randomized in other ways than by using the selection factor to weight the error values. For example, the selection factor can be randomly selected, and if the selection factor is greater than a threshold value, the parent data point 206 can be selected regardless of the respective error values of the parent data point 206 and the child data point 218.

Figure 3:
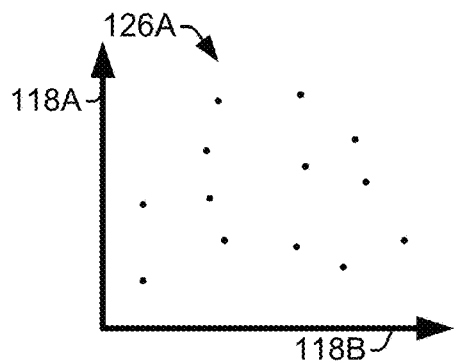
FIG. 3 is a set of diagrams illustrating aspects of an evolutionary search process to estimate yield criteria of a material according to a particular implementation.
Figure 3:
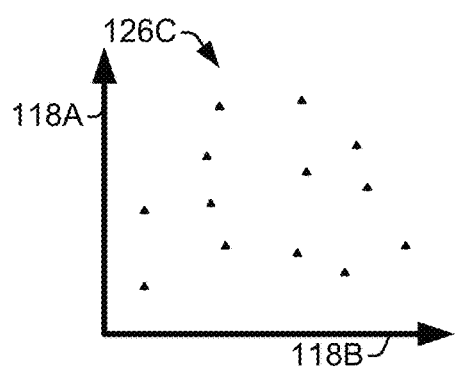
Figure 3:
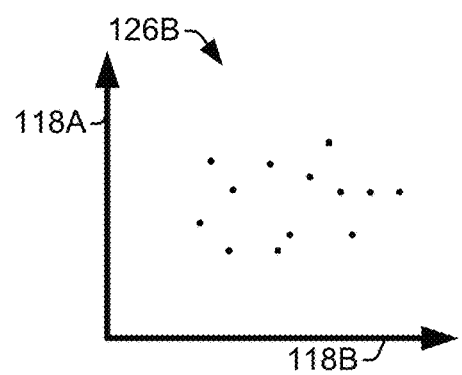
Figure 3:
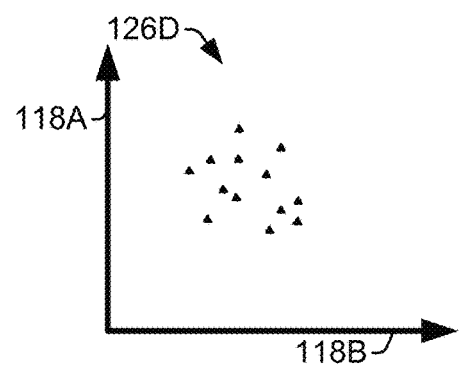
Figure 3:
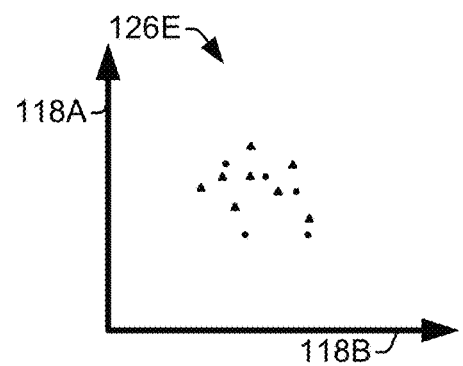
Figure 3:
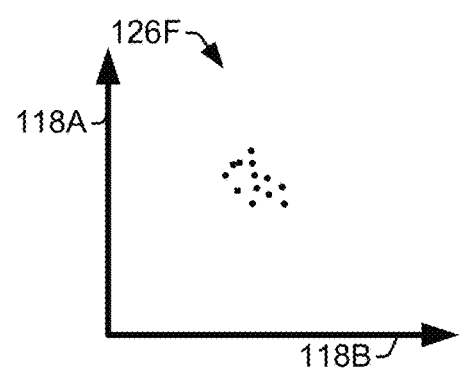

FIG. 3 is a set of diagrams illustrating aspects of an evolutionary search process to estimate yield criteria of a material according to a particular implementation. In particular, FIG. 3 illustrates examples of multiple populations of data points 126 at various states of an evolutionary search process. FIG. 3 also illustrates use of parallel operations during execution of the evolutionary search process.

The populations of data points 126 in FIG. 3 include a first population 126A, a second population 126B, a third population 126C, a fourth population 126D, a fifth population 126E, and a sixth population 126F. Six populations of data points 126 are illustrated in FIG. 3 merely as one example. In other examples, the evolutionary search process can use more than six populations of data points 126 or fewer than six populations of data points 126.

In the example illustrated in FIG. 3, the first population 126A includes a set of data points that are randomly selected within an N-dimensional feature space, where N is the number of parameters 118 of the function 116 that are to be identified using the evolutionary search process. In FIG. 3, only a value of a first parameter 118A and a value of a second parameter 118B of each of the data points are shown; however, as explained above, the function 116 can include more than two parameters 118.

Each data point of the second population 126B is determined from one or more data points of the first population 126A via one or more evolutionary operation, such as the operations described with reference to FIGS. 2A and 2B. For example, each data point of the second population 126B is either identical to a data point of the first population 126A, or is a child data point determined via mutation, crossover, and selection processes as described with reference to FIGS. 2A and 2B.

In FIG. 3, the third population 126C includes the same data points as the first population 126A. That is, the third population 126C is a copy of or a second instance of the first population 126A. In other implementations, the third population 126C is different from the first population 126A. For example, each data point of the third population 126C can be randomly selected within the N-dimensional feature space.

Whether the third population 126C is identical to the first population 126A or is different from the first population 126A, the third population 126C and the first population 126A can be processed in parallel to identify candidate values of the parameters 118 of the function 116. For example, the fourth population 126D is determined, using evolutionary processes described with reference to FIGS. 2A and 2B, from the third population 126C.

In an illustrative example of parallel operation, a first evolutionary search process can be performed (e.g., a first instance of the evolutionary search process instructions 122 can be executed) at a first subset of the processing cores 111, and a second evolutionary search process can be performed (e.g., a second instance of the evolutionary search process instructions 122 can be executed) concurrently with the first evolutionary search process at a second subset of the processing cores 111. In this illustrative example, the first evolutionary search process is performed iteratively until an iteration criterion is satisfied. The first evolutionary search process includes determining a first error value indicative of how closely the function 116 represents the test data 106 when potential values represented by a first data point of the first population 126A are used as the parameters of the function. The first evolutionary search process also includes performing, based on the first population 126A, one or more evolutionary processes to generate a second data point (e.g., a child data point) as a candidate for replacing the first data point in the second population 126B. The first evolutionary search process also includes determining a second error value indicative of how closely the function 116 represents the test data 106 when potential values represented by the second data point are used as the parameters 118 of the function 116, and selecting either the first data point or the second data point for inclusion in the second population 126B.

Continuing the illustrative example of parallel operation, the second evolutionary search process can also be performed iteratively until the iteration criterion is satisfied, and can include determining a third error value indicative of how closely the function 116 represents the test data 106 when potential values represented by a third data point of the third population 126C are used as the parameters 118 of the function 116. The second evolutionary search process also includes performing, based on the third population 126C, one or more evolutionary processes to generate a fourth data point as a candidate for replacing the third data point in the fourth population 126D. The second evolutionary search process further includes determining a fourth error value indicative of how closely the function 116 represents the test data 106 when potential values represented by the fourth data point are used as the parameters 118 of the function 116, and selecting, based on a comparison of the third error value and the fourth error value, either the third data point or the fourth data point for inclusion in the fourth population 126D.

In the illustrative example of parallel operation above, one or more of the operations to determine the fourth population 126D is performed concurrently with (e.g., in parallel with) one or more of the operations to determine the second population 126B. To illustrate, a first processor, a first processing core, or a first subset of the processing cores 111 performs operations to determine the second population 126B based on the first population 126A, and in parallel, a second processor, a second processing core, or a second subset of the processing cores 111 performs operations to determine the fourth population 126D based on the third population 126C. Performing such operations in parallel allows the evolutionary search process to cover a large portion of the N-dimension feature space, or put another way, to consider more candidate parameter values, in a particular time (as compared to non-parallelizable search operations, such as a Newton-Raphson optimization processes).

In implementations that generate two or more distinct populations of data points 126, such as the second population 126B and the fourth population 126D, via evolutionary search processes, the two or more distinct populations of data points 126 can be combined to form an aggregate population, such as the fifth population 126E. As an aggregate population, the fifth population 126E includes one or more data points from the second population 126B and one or more data points from the fourth population 126D. In a particular example, each data point of the fifth population 126E is selected randomly from among the second population 126B and the fourth population 126D. In another example, the fifth population 126E includes every data point of the second population 126B and every data point of the fourth population 126D. In yet another example, the second population 126B and the fourth population 126D are combined and a set of data points corresponding to a most densely populated region of the N-dimensional feature space are selected as the fifth population 126E.

In some implementations, the estimated parameter values 156 are selected from or determined based on the fifth population 126E. In the example illustrated in FIG. 3, the fifth population 126E is used to generate the sixth population 126F via an evolutionary search process. To illustrate, after generating the aggregate population of data points (e.g., the fifth population 126E) based on two or more other populations (e.g., the second population 126B and the fourth population 126D), the example of parallel operation above can be continued by performing a third evolutionary search process. In this example, the third evolutionary search process is performed iteratively until the iteration criterion is satisfied. The third evolutionary search process includes determining a fifth error value indicative of how closely the function 116 represents the test data 106 when the potential values represented by a fifth data point of the fifth population 126E are used as the parameters 118 of the function 116. The third evolutionary search process also include performing, based on the fifth population 126E, one or more evolutionary processes to generate a sixth data point as a candidate for replacing the fifth data point in a second aggregate population of data points (e.g., the sixth population 126F). The third evolutionary search process also includes determining a sixth error value indicative of how closely the function 116 represents the test data 106 when potential values represented by the sixth data point are used as the parameters 118 of the function 116. The third evolutionary search process further includes selecting, based on a comparison of the fifth error value and the sixth error value, either the fifth data point or the sixth data point for inclusion in the sixth population 126F.

Although FIG. 3 illustrates six populations 126, in other implementations, parallel execution of evolutionary search processes generate more than six populations 126 or fewer than six populations 126. For example, FIG. 3 illustrates execution of two evolutionary search operations in parallel (e.g., a first evolutionary search operation initialized using the first population 126A and a second evolutionary search operation initialized using the third population 126C); however, in other implementations, more than two evolutionary search operations can be performed in parallel. As another example, in FIG. 3, each evolutionary search process is illustrated with two populations 126 including an initial population (such as the first population 126A) and a resultant population (such as the second population 126B); however, in some implementations, one or more evolutionary search processes can generate one or more intermediate populations 126 between the initial population and the resultant population.

Further, while FIG. 3 illustrates parallel operations that operation on distinct populations 126, in some implementations, operations associated with a single population 126 can also, or in the alternative, be performed in parallel. For example, evolutionary operations that use data points of one population (e.g., the first population 126A) to generate, evaluate, and/or select data points for another population (e.g., the second population 126B) can be performed in parallel, as explained further with reference to FIGS. 5 and 6.

Figure 4:
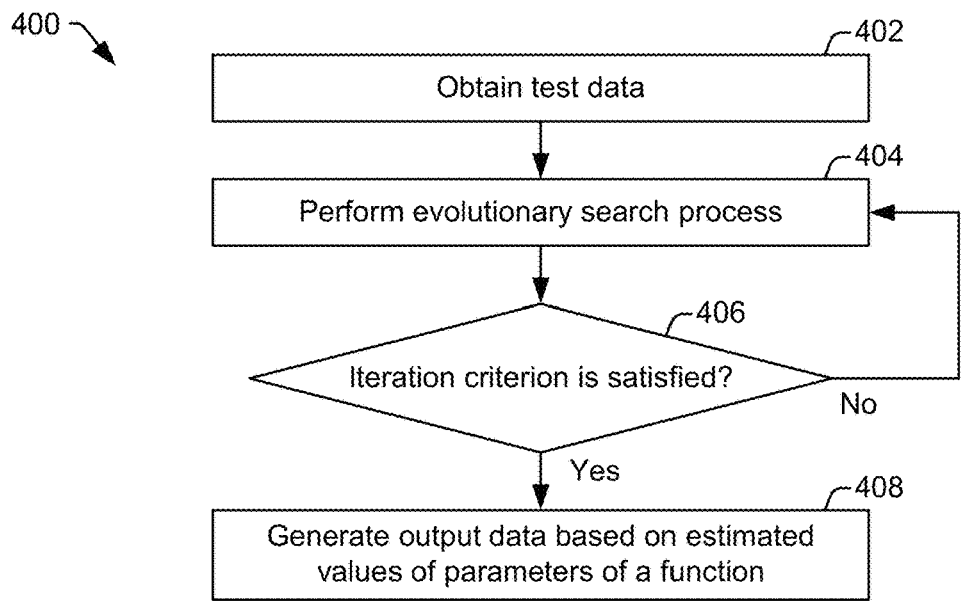
FIG. 4 is a flow chart of an example of a method of estimating yield criteria of a material according to a particular implementation.

FIG. 4 is a flow chart of an example of a method 400 of estimating yield criteria of a material according to a particular implementation. The method 400 can be initiated, controlled, or performed, for example, by computing device 108 of FIG. 1. To illustrate, the processor 110 of FIG. 1 can execute the instructions 120 to identify the estimated parameter values 156 according to the method 400 of FIG. 4.

The method 400 includes, at 402, obtaining test data representing anisotropic material properties of a material. For example, the computing device 108 can obtain the test data 106 from the material testing system 104. In other examples, the test data 106 can be generated by the material testing system 104 and stored on a memory or other storage medium and subsequently transferred to the computing device 108. In some implementations, the test data 106 can be obtained from another source. To illustrate, a supplier of the material 146 can provide the test data 106.

The method 400 includes, at 404, performing an evolutionary search process. The evolutionary search processes starts from an initial population of data points, then uses mutation, crossover, and possibly other operations to generate a new population of data points, with the goal of converging toward values (e.g., the estimated parameter values 156 of FIG. 1) of a set of parameters 118 of a function 116 descriptive of yield criteria of the material 146. An example of the evolutionary search process is described with reference to FIG. 5.

The method 400 also includes, at 406, determining whether an iteration criterion (e.g., the iteration criterion 125 of FIG. 1) is satisfied. In some implementations, the iteration criterion 125 specifies a threshold number of iterations of the evolutionary search process. In such implementations, the iteration criterion 125 is satisfied when the threshold number of iterations of the evolutionary search process have been performed. In some implementations, the iteration criterion 125 specifies a threshold error value, and the iteration criterion 125 is satisfied when an error value 134 of a data point identified via the evolutionary search process is less than (or less than or equal to) the threshold error value. In some implementations, the iteration criterion 125 specifies a convergence threshold value. In such implementations, the iteration criterion 125 is satisfied when the difference between two populations of data points 126 is less than (or less than or equal to) the convergence threshold value. For example, a centroid (in the N-dimensional feature space) of a first population (e.g., the first population 126A of FIG. 3) can be compared to a centroid of a second population (e.g., the second population 126B of FIG. 3) that is derived from the first population via the evolutionary search process. In this example, the convergence threshold value corresponds to a distance in the N-dimensional feature space and satisfying the convergence threshold value indicates that a population-to-population change due to the evolutionary search process is relatively small.

In still other implementations, the iteration criterion 125 specify more than one threshold, and the iteration criterion 125 is satisfied when one of the thresholds is met or when a set of the thresholds are met. For example, the iteration criterion 125 can specify a threshold number of iterations and a threshold error value. In this example, the iteration criterion 125 may be satisfied when the threshold number of iterations of the evolutionary search process have been performed, when the error value of a data point identified via the evolutionary search process is less than (or less than or equal to) the threshold error value, or when the threshold number of iterations have been performed and the error value of the data point is less than (or less than or equal to) the threshold error value.

The method 400 includes, in response to determining that the iteration criterion 125 is not satisfied, performing one or more additional evolutionary search processes, at 404. The method 400 also includes, in response to determining that the iteration criterion 125 is satisfied, generating output data (e.g., the output data 144 of FIG. 1) based on estimated values of the parameters that are identified by performing the operations, at 408. For example, the output data 144 of FIG. 1 is generated by the output generator instructions 142 and provided to the fabrication tool 150, to the display device 154, or both. In some implementations, the output data 144 includes (or can be used to control or design) fabrication process parameters 152 that specify, based on the yield criteria, how the fabrication tool 150 is to manipulate the material 146 to form the fabricated object 160. In some implementations, the output data 144 includes or indicates estimated parameter values 156 of the function 116, the surface map 158 representing a yield surface based on the yield criteria, another graphical representation of the yield criteria, or a combination thereof.

Figure 5:
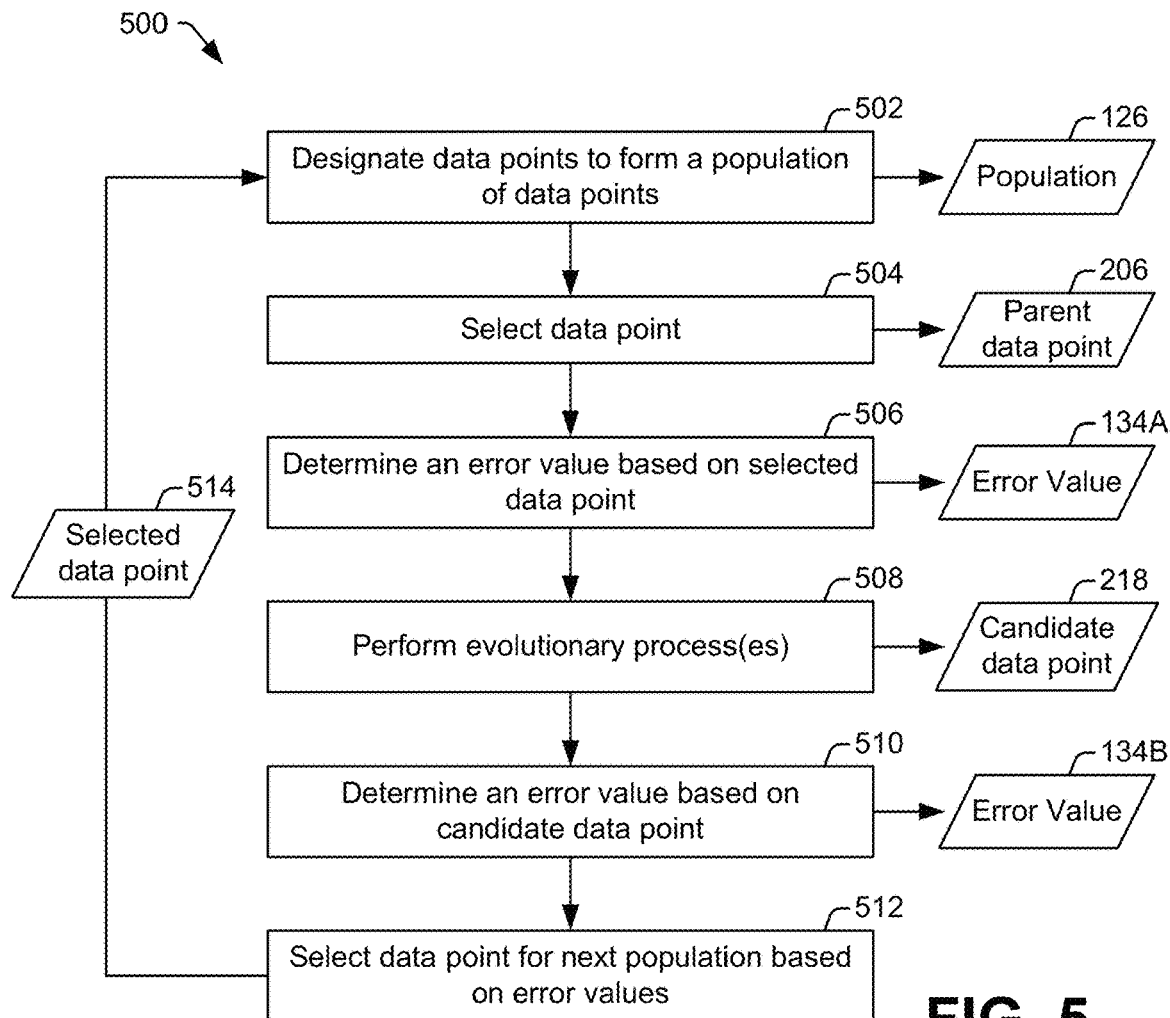
FIG. 5 is a flow chart of an example of an evolutionary search process to estimate yield criteria of a material according to a particular implementation.

FIG. 5 is a flow chart of an example of an evolutionary search process 500 to estimate yield criteria of a material (e.g., the material 146 of FIG. 1) according to a particular implementation. The evolutionary search process 500 can be initiated, controlled, or performed, for example, by the computing device 108 of FIG. 1. To illustrate, the processor 110 of FIG. 1 can execute the instructions 120 to perform the evolutionary search process 500 of FIG. 5. In some implementations, one or more operations of the evolutionary search process 500 are performed during each iteration of the method 400 of FIG. 4.

In FIG. 5, the evolutionary search process 500 includes, at 502, designating a plurality of data points to form a population of data points 126. Each data point represents potential values of the parameters 118 of a function 116 that describes the yield criteria of the material 146. In a particular implementation, an initial population of data points 126 is designated by randomly selecting the values of parameters 118 (e.g., randomly selecting points in an N-dimensional feature space). During subsequent iterations, one or more data points of the population of data points 126 is designated by selecting a data point from a set of candidate data points, as explained further below.

The evolutionary search process 500 includes, at 504, selecting a first data point (e.g., the parent data point 206) and, at 506, determining an error value (e.g., a first error value 134A) based on the parent data point 206. The first error value 134A indicates how closely the function 116 represents the test data 106 when the potential values represented by the parent data point 206 are used as the parameters 118 of the function 116.

The evolutionary search process 500 also includes, at 508, performing one or more evolutionary processes to generate a second data point (e.g., the candidate data point 218) as a candidate for replacing the parent data point 206 in the population of data points 126 during a subsequent iteration. The evolutionary processes can include, for example, selection of mutation reference data points, generation of a mutation data point, and crossover to form a child data point (e.g., the candidate data point 218). Specific examples of evolutionary operations are described in further detail with reference to FIG. 6.

The evolutionary search process 500 further includes, at 510, determining an error value (e.g., a second error value 134B) based on the candidate data point 218. The second error value 134B is indicative of how closely the function 116 represents the test data 106 when potential values represented by the candidate data point 218 are used as the parameters 118 of the function 116.

The evolutionary search process 500 also includes, at 512, selecting a data point (e.g., a selected data point 514) from between the parent data point 206 and the candidate data point 218. In a particular implementation, the selected data point 514 is selected based on a comparison of the first error value 134A and the second error value 134B. For example, a data point associated with the lower of the two error values 134A and 134B is selected for inclusion in the population of data points 126 during the next iteration. In some implementations, a selection factor is used to select the selected data point 514. In such implementations, the selection factor includes a randomly selected value that is used to introduce some randomness into the selection operation. For example, the selection factor can be used to weight the error values 134A and 134B and the weighted error values can be compared to select the selected data point 514. The selected data point 514 is designated as a member of the population of data points 126 for a subsequent iteration of the evolutionary search process 500.

FIG. 6 is a diagram illustrating data and operations associated with evolutionary processes of an evolutionary search process to estimate yield criteria of a material according to a particular implementation. The operations illustrated in FIG. 6 can be initiated, controlled, or performed, for example, by the computing device 108 of FIG. 1. To illustrate, the processor 110 of FIG. 1 can execute the instructions 120 to perform the operations illustrated in FIG. 6. For example, FIG. 6 illustrates difference calculator instructions 602, shifter instructions 604, and crossover instructions 608, which together correspond to the mutation and crossover instructions 136 of FIG. 1, in some implementations. In some implementations, one or more of the operations illustrated in FIG. 6 are performed during the evolutionary search process 500 of FIG. 5.

In the particular example illustrated in FIG. 6, three data points (illustrated as vectors in FIG. 6) are used to perform the evaluation operations. The three data points include a parent data point 206 (elements of which are labeled "1st DP" in FIG. 6), a first mutation reference data point 208 ("1st MR" in FIG. 6), and a second MR data point 210 (elements of which are labeled "2nd MR" in FIG. 6), as described with reference to FIGS. 2A and 2B. In a particular implementation, each of the three data points 206, 208, 210 is selected randomly from a population of data points 126. In some implementations, every data point of each population of data points 126 is used as the parent data point 206 during each iteration of an evolutionary search process. In such implementations, the parent data point 206 can be selected according to a structured process (e.g., data points are selected sequentially) and the mutation reference data points 208, 210 used in the evolutionary process are selected randomly from among the population 126. Each of the data points 206, 208, 210 of FIG. 6 is represented by a vector including N elements, indicated by subscripts 1 through n. In this manner, each data point 206, 208, 210 corresponds to a point in an N-dimensional feature space, where N is equal to the number of parameters 118 of the function 116 that are to be identified using the evolutionary search process.

After the data points 206, 208, 210 are selected, the difference calculator instructions 602 determine a difference vector 212 (elements of which are labeled "Diff" in FIG. 6) that indicates a distance and a direction between the first mutation reference data point 208 and the second mutation reference data point 210. The shifter instructions 604 shift the parent data point 206 based on the difference vector 212 to determine a mutation data point 216 (elements of which are labeled "1st MP" in FIG. 6). For example, the shifter instructions 604 shift the parent data point 206 in the direction indicated by the difference vector 212 and by a distance that is less than or equal to the distance indicated by the difference vector 212. In some implementations, the shifter instructions 604 apply a distance factor 606 to the distance indicated by the difference vector 212 before shifting the parent data point 206. In such implementations, the distance factor 606 is a randomly selected value between zero and one. Accordingly, the mutation data point 216 is at least as close to the parent data point 206 as the first mutation reference data point 208 is to the second mutation reference data point 210.

Crossover instructions 608 perform crossover operations based on the parent data point 206 and the mutation data point 216 to determine the child data point 218. The crossover operations are performed element-by-element. For example, each element (e.g., a potential value of a corresponding parameter 118) of the child data point 218 is set to the value of a corresponding element (e.g., a potential value of the same parameter) represented by the parent data point 206 or to the value of the corresponding element (e.g., another potential value of the same parameter) represented by the mutation data point 216. To illustrate, in FIG. 6, a first element (having subscript 1) of the child data point 218 has a value "1st $MP_1$" corresponding to the value of the first element of the mutation data point 216. Further, a second element (having subscript 2) of the child data point 218 has a value "1st $MP_2$" corresponding to the value of the second element of the mutation data point 214, and a third element (having subscript 3) of the child data point 218 has a value "1st $DP_3$" corresponding to the value of the third element of the parent data point 206, and so forth. The element-by-element selection of values between the parent data point 206 and the mutation data point 216 is random. To illustrate, the crossover instructions 608 assign a value of the first data element of the child data point 218 by randomly selecting either the value of the first data element of the parent data point 206 or the value of the first data element of the mutation data point 216. Likewise, the crossover instructions 608 assign a value of the second data element of the child data point 218 by randomly selecting either the value of the second data element of the parent data point 206 or the value of the second data element of the mutation data point 216. The random element-by-element selection continues until each element of the child data point 218 has been assigned a value.

The selector instructions 610 select either the parent data point 206 or the child data point 218 as a selected data point 514 for a population of data points used in a subsequent iteration. In a particular implementation, the selector instructions 610 compare error values associated with the parent data point 206 and the child data point 218 and select as the selected data point 514 the data point with the lower error value. In some implementations, the selector instructions 610 use a selection factor 612 to select the selected data point 514. In such implementations, the selection factor 612 includes a randomly selected value that is used to introduce some randomness or jitter into the selection operation (e.g., to reduce the likelihood of the evolutionary search process converging on data point associated with a local minimum error value rather than on a data point with a global minimum error value).

Figure 7:
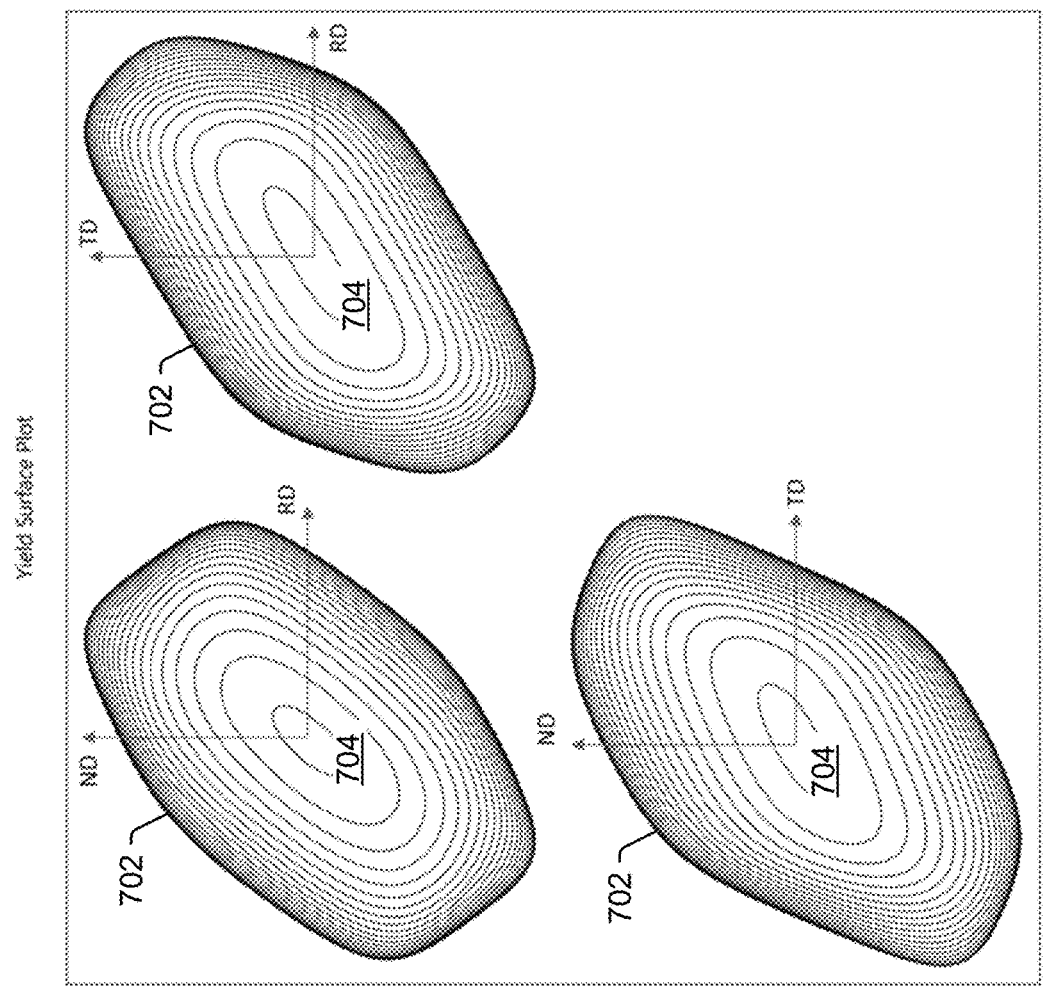
FIG. 7 is a diagram illustrating a graphical representation of yield criteria of a material estimated according to a particular implementation.

FIG. 7 is a diagram illustrating a graphical representation of yield criteria of a material estimated according to a particular implementation. The graphical representation illustrated in FIG. 7 can be generated by the computing device 108 of FIG. 1. For example, the output data 144 can include the surface map 158 which includes or corresponds to the graphical representation of FIG. 7.

The graphical representation illustrated in FIG. 7 maps the yield criteria of a material (e.g., the material 146) as a six-dimensional yield surface. In FIG. 7, the yield surface is illustrated using three views. Each view is a graphical representation of the yield surface along one of a roll direction (RD) axis, a transverse direction (TD) axis, or a normal direction (ND) axis. Together the three views graphically represent a boundary 702 of a volume 704 in a six-dimensional space.

Figure 8:
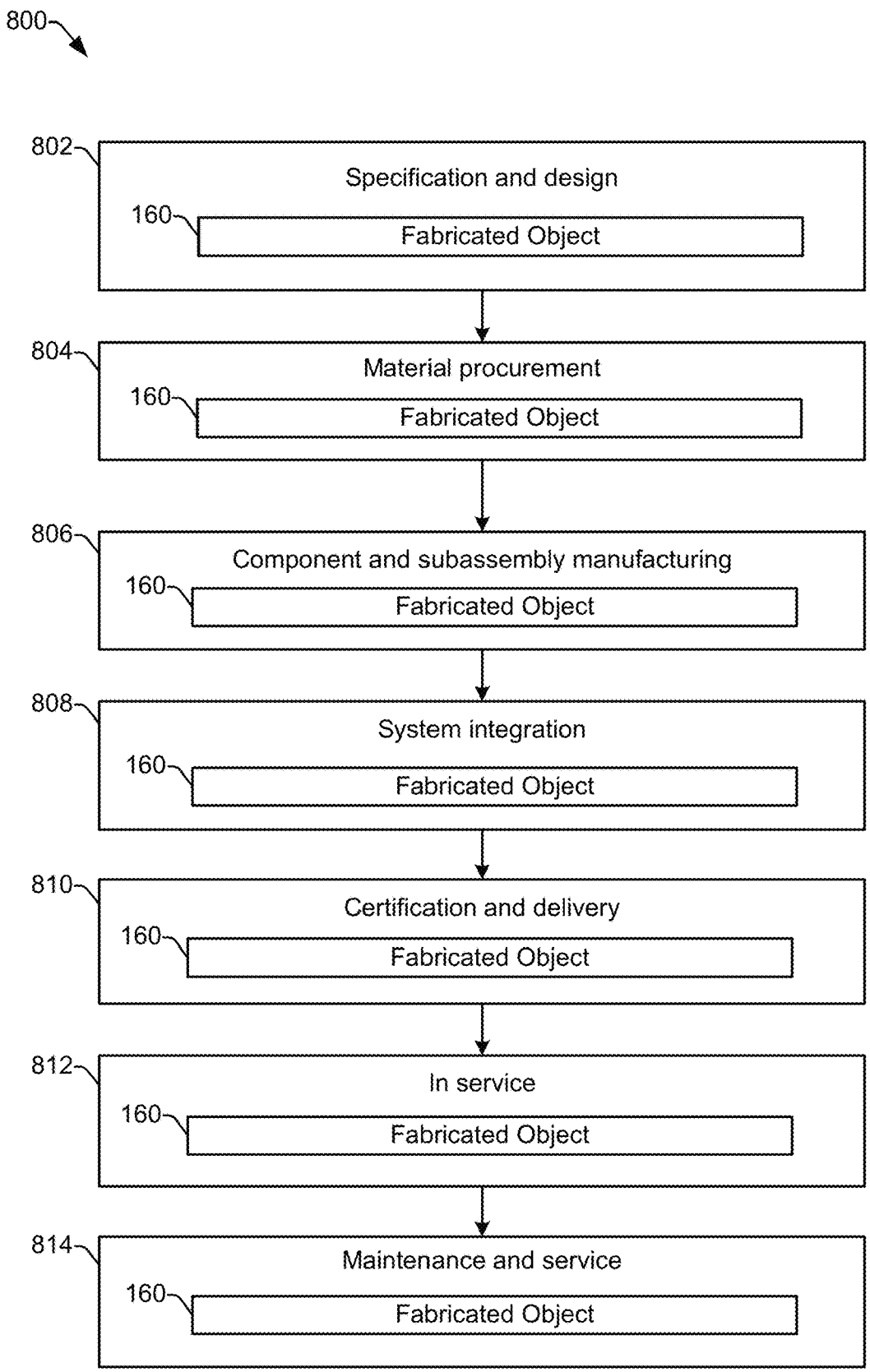
FIG. 8 is a flowchart illustrating a life cycle of an aircraft that includes as a component therein an object fabricated based on yield criteria estimated according to a particular implementation.

FIG. 8 is a flowchart illustrating a life cycle 800 of an aircraft that includes as a component therein an object (e.g., the fabricated object 160) fabricated based on yield criteria estimated according to a particular implementation. During pre-production, the exemplary life cycle 800 includes, at 802, specification and design of an aircraft, such as the aircraft 900 of FIG. 9. During specification and design of the aircraft, the fabricated object 160 can be specified or designed. To illustrate, a material 146 to form the fabricated object 160 can be specified, material properties (such as elastic deformation strain limits 148) of the material can be determined, fabrication process parameters 152 can be determined, etc. At 804, the life cycle 800 includes material procurement, which may include procuring the material 146 for the fabricated object 160.

During production, the life cycle 800 includes, at 806, component and subassembly manufacturing and, at 808, system integration of the aircraft. For example, the life cycle 800 may include component and subassembly manufacturing to form the fabricated object 160 and system integration of the fabricated object 160 with other components of the aircraft. At 810, the life cycle 800 includes certification and delivery of the aircraft and, at 812, placing the aircraft in service. Certification and delivery may include certification of the fabricated object 160 to place the fabricated object 160 in service. While in service by a customer, the aircraft may be scheduled for routine maintenance and service (which may also include modification, reconfiguration, refurbishment, and so on). At 814, the life cycle 800 includes performing maintenance and service on the aircraft, which may include performing maintenance and service on the fabricated object 160.

Each of the stages 802-814 of the life cycle 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 9:
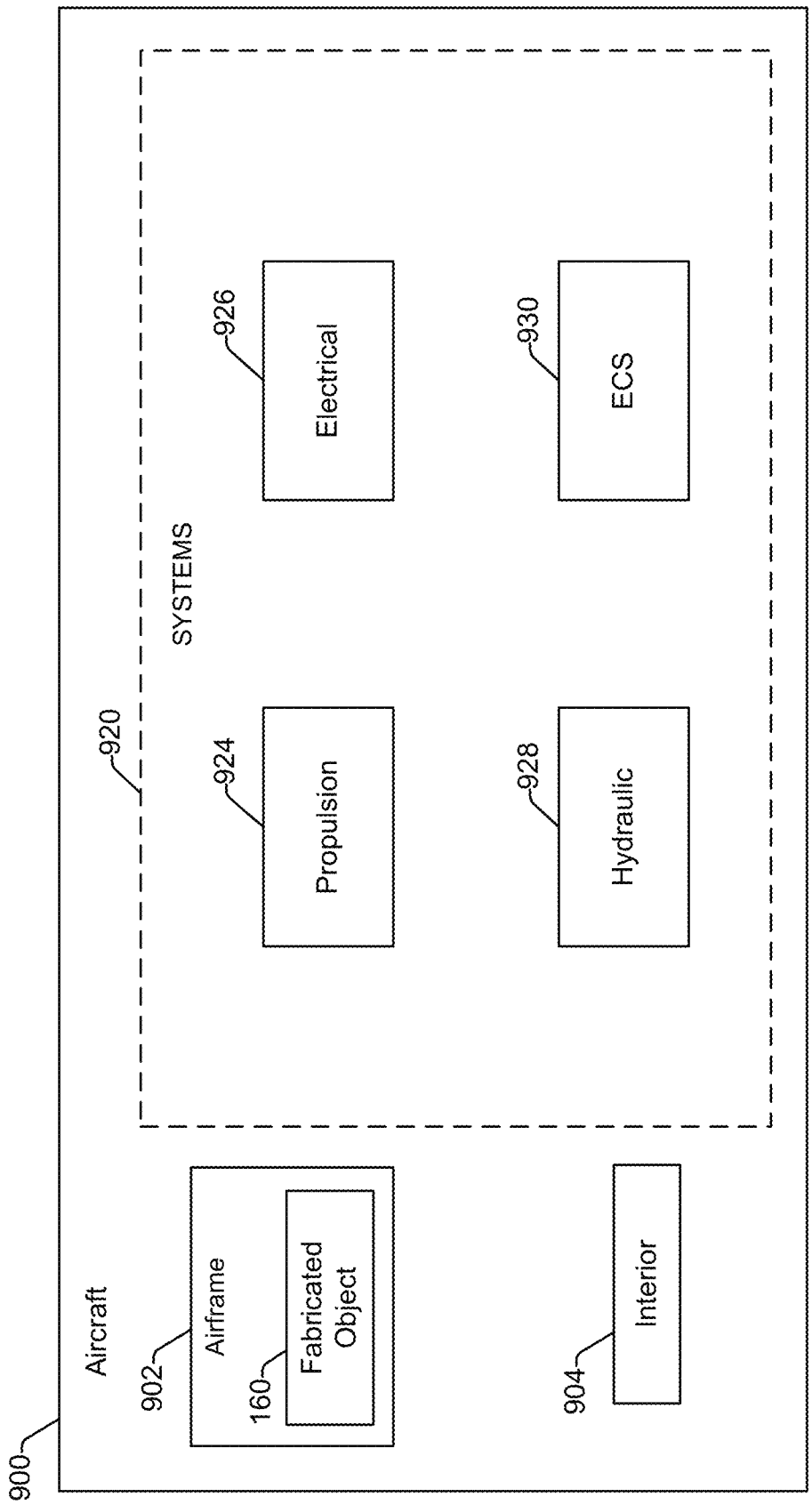
FIG. 9 is a block diagram of an aircraft that includes as a component therein an object fabricated based on yield criteria estimated according to a particular implementation.

FIG. 9 is a block diagram of the aircraft 900 that includes as a component therein an object (e.g., the fabricated object 160) fabricated based on yield criteria estimated according to a particular implementation. As shown in FIG. 9, the aircraft 900 produced by the life cycle 800 may include an airframe 902 with a plurality of systems 920 and an interior 904. Examples of high-level systems 920 include one or more of a propulsion system 924, an electrical system 926, a hydraulic system 928, and an environmental control system 930. In the example illustrated in FIG. 9, the fabricated object 160 is a component of or integrated within the airframe 902. However, in other implementations, the fabricated object 160 is a component of another portion of the aircraft 900, such as the interior 904 or one of the systems 920.

Apparatus and methods embodied herein may be employed during any one or more of the stages of the life cycle 800. For example, components or subassemblies corresponding to a production process (e.g., the system integration stage 808) may be fabricated or manufactured in a manner similar to components or subassemblies produced while the aircraft 900 is in service, at 812 for example and without limitation. Also, one or more apparatus embodiments, method embodiments, or a combination thereof may be utilized during production stages (e.g., stages 802-810 of the life cycle 800), for example, by substantially expediting assembly of or reducing the cost of the aircraft 900. Similarly, one or more of apparatus embodiments, method embodiments, or a combination thereof may be utilized while the aircraft 900 is in service, at 812 for example and without limitation, or during maintenance and service, at 814. Although FIGS. 8 and 9 illustrate an aerospace example, the present disclosure may be applied to other industries. For example, the fabricated object 160 can be used onboard a manned or unmanned vehicle (such as a satellite, a watercraft, or a land-based vehicle), or in a building or other structure.

Figure 10:
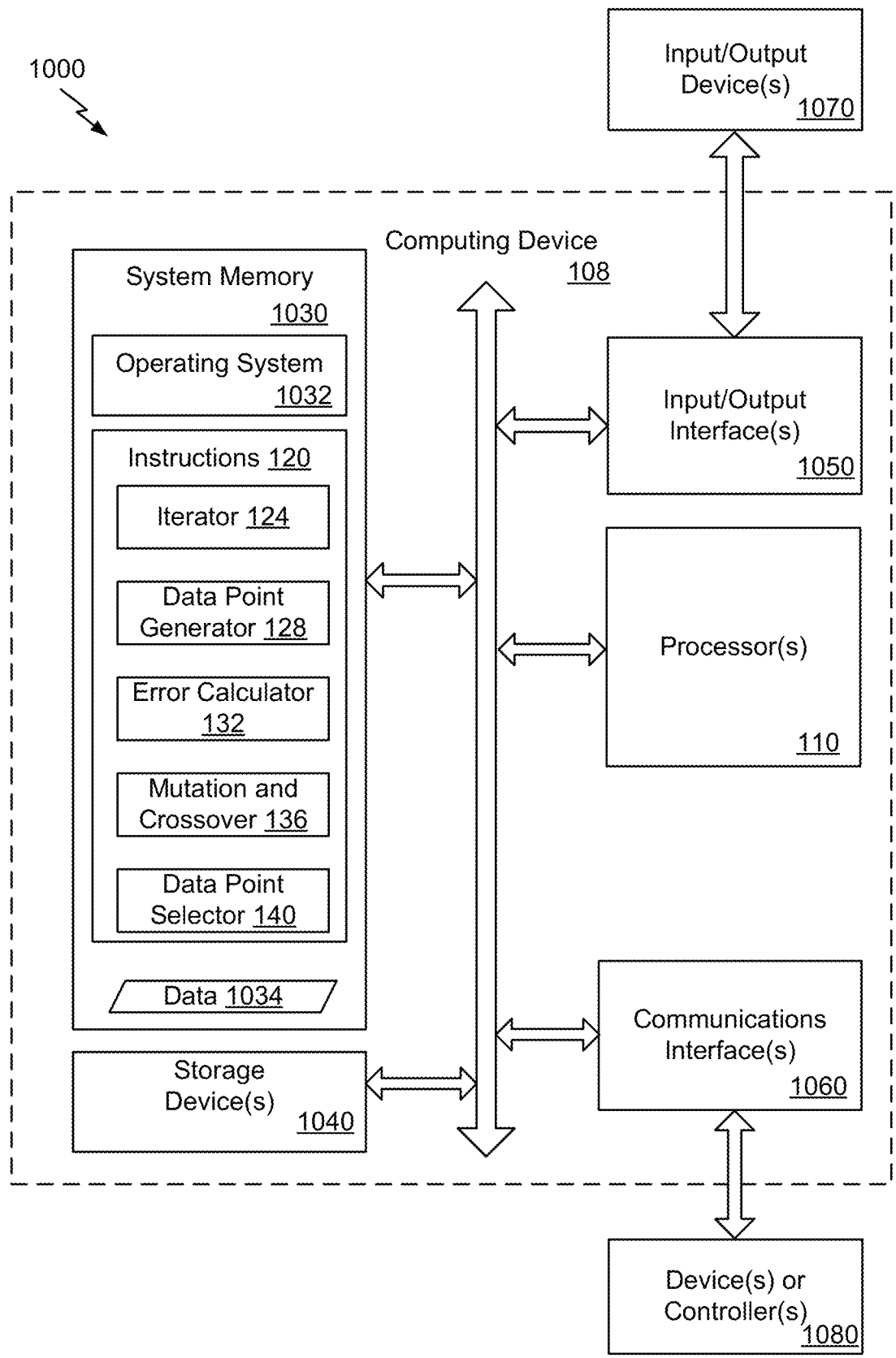
FIG. 10 is a block diagram of a computing device configured to estimate yield criteria of a material according to a particular implementation.

FIG. 10 is a block diagram of a computing environment 1000 including a particular one of the one or more computing devices 108 configured to estimate yield criteria of a material according to a particular implementation. The computing device 108 includes the one or more processors 110. Within the computing device 108, the processor 110 communicates with a system memory 1030, one or more storage devices 1040, one or more input/output interfaces 1050, one or more communications interfaces 1060, or a combination thereof.

The system memory 1030, the storage device 1040, or both, correspond to the memory device 112 of FIG. 1. The system memory 1030 includes volatile memory devices (e.g., random access memory (RAM) devices), nonvolatile memory devices (e.g., read-only memory (ROM) devices, programmable read-only memory, and flash memory), or both. The system memory 1030 includes an operating system 1032, which in some implementations includes a basic input/output system for booting the computing device 108 as well as a full operating system to enable the computing device 108 to interact with users, other programs, and other devices. The system memory 1030 also includes the instructions 120 and data 1034. The data 1034 includes, for example, the settings 114, data descriptive of the function 116, and working data, such as data descriptive of one or more data points. The instructions 120 are executable by the processor 110 to estimate yield criteria of a material using an evolutionary search processes. For example, the instructions 120 include the iterator instructions 124, the data point generator instructions 128, the error calculator instructions 132, the mutation and crossover instructions 136, and the data point selector instructions 140 of FIG. 1.

The storage device 1040 includes nonvolatile storage devices, such as magnetic disks, optical disks, or flash memory devices. In some implementations, the storage device 1040 includes both removable and non-removable memory devices. In a particular implementation, the storage devices 1040 is configured to store the operating system 1032, the instructions 120, the data 1034, or a combination thereof. The system memory 1030 and the storage device 1040 are physical devices and are not a signal.

In a particular implementation, the processor 110 is configured to execute computer executable instructions, such as the instructions 120. In some implementations, the processor 110 includes multiple processing cores 111, which are configured to execute particular portions of the instructions 120 in parallel.

The input/output interface 1050 enables the computing device 108 to communicate with one or more input/output devices 1070 to facilitate user interaction. For example, the input/output interface 1050 is adapted to receive input from a user, to receive input from another computing device, or a combination thereof. For example, the computing device 108 can receive the test data 106 of FIG. 1 via the input/output interface 1050. In some implementations, the input/output interface 1050 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, N.J.). In some implementations, the input/output device 1070 includes one or more user interface devices and displays, including some combination of buttons, keyboards, pointing devices, displays, speakers, microphones, touch screens, and other devices. In some implementations, the processor 110 detects interaction events based on user input received via the input/output interface 1050. Additionally, in some implementations, the processor 110 sends a display to a display device (e.g., the display device 154 of FIG. 1) via the input/output interface 1050.

The communications interface 1060 enables the computing device 108 to communicate with one or more other computing devices or controllers 1080. The communications interface 1060 may include wired Ethernet interfaces, IEEE 802 wireless interfaces, Bluetooth communications interfaces, electrical (or power line) interfaces, optical or radio frequency interfaces, or other wired or wireless interfaces. The other computer device or controller 1080 includes one or more host computers, servers, workstations, portable computers, telephones, tablet computers, the fabrication tool 150 of FIG. 1, or any other communication device or component, as non-limiting examples.

In conjunction with the described systems and methods, an apparatus for estimating yield criteria of a material is disclosed that includes means for obtaining test data representing anisotropic material properties of a material. In some implementations, the means for obtaining the test data corresponds to the instructions 120, the input/output interface 1050, the communications interface 1060, the computing device 108, the processor 110, the processing cores 111, one or more other circuits or devices configured to receive test data, or a combination thereof.

The apparatus includes means for performing an evolutionary search process to identify parameters of a function descriptive of yield criteria of the material. For example, the means for performing an evolutionary search process can correspond to the instructions 120, the computing device 108, the processor 110, the processing cores 111, one or more other devices configured to performing an evolutionary search process, or a combination thereof.

The apparatus includes means for generating output data based on estimated values of the parameters. For example, the means for generating output data can correspond to the instructions 120, the input/output interface 1050, the communication interface 1060, the computing device 108, the processor 110, the processing cores 111, one or more other devices configured to generating output data, or a combination thereof.

Although one or more of FIGS. 1-10 may illustrate systems, apparatuses, and/or methods according to the teachings of the disclosure, the disclosure is not limited to these illustrated systems, apparatuses, and/or methods. One or more functions or components of any of FIGS. 1-10 as illustrated or described herein may be combined with one or more other portions of another of FIGS. 1-10. Accordingly, no single implementation described herein should be construed as limiting and implementations of the disclosure may be suitably combined without departing form the teachings of the disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A computer-implemented method of estimating yield criteria of a material, the method comprising using one or more processors to perform operations including:
   obtaining test data representing anisotropic material properties of a material;
   performing a first evolutionary search process to identify parameters of a function descriptive of yield criteria of the material, wherein performing the first evolutionary search process includes, iteratively performing until an iteration criterion is satisfied:
      designating a plurality of data points to form a first population of data points, each data point of the plurality of data points representing potential values of the parameters;
      determining a first error value indicative of how closely the function represents the test data when the potential values represented by a first data point of the first population of data points are used as the parameters of the function;
      performing, based on the first population of data points, one or more evolutionary processes to generate a second data point as a candidate for replacing the first data point in a second population of data points;
      determining a second error value indicative of how closely the function represents the test data when potential values represented by the second data point are used as the parameters of the function; and
      selecting, based on a comparison of the first error value and the second error value, either the first data point or the second data point for inclusion in the second population of data points; and
   in response to determining that the iteration criterion is satisfied, generating output data based on estimated values of the parameters that are identified by performing the operations.

2. The computer-implemented method of claim 1, wherein the first evolutionary search process is performed at a first subset of processing cores of the one or more processors, and wherein the operations performed using the one or more processors further comprise:
   performing a second evolutionary search process at a second subset of processing cores of the one or more processors, the second evolutionary search process performed concurrently with the first evolutionary search process, wherein performing the second evolutionary search process includes, iteratively performing until the iteration criterion is satisfied:
      determining a third error value indicative of how closely the function represents the test data when the potential values represented by a third data point of a third population of data points are used as the parameters of the function;
      performing, based on the third population of data points, one or more evolutionary processes to generate a fourth data point as a candidate for replacing the third data point in a fourth population of data points;
      determining a fourth error value indicative of how closely the function represents the test data when potential values represented by the fourth data point are used as the parameters of the function; and
      selecting, based on a comparison of the third error value and the fourth error value, either the third data point or the fourth data point for inclusion in the fourth population of data points.

3. The computer-implemented method of claim 2, wherein the third population of data points is identical to the first population of data points.

4. The computer-implemented method of claim 2, wherein the third population of data points is different from the first population of data points, and wherein performing the second evolutionary search process further includes generating a second plurality of data points to form the third population of data points, each data point of the second plurality of data points representing second potential values of the parameters.

5. The computer-implemented method of claim 2, further comprising generating an aggregate population of data points, the aggregate population of data points including one or more data points from the second population of data points and one or more data points from the fourth population of data points, wherein the output data is based on the aggregate population of data points.

6. The computer-implemented method of claim 5, further comprising, after generating the aggregate population of data points, using the one or more processors to perform a third evolutionary search process, wherein performing the third evolutionary search process includes, iteratively performing until the iteration criterion is satisfied:
   determining a fifth error value indicative of how closely the function represents the test data when the potential values represented by a fifth data point of the aggregate population of data points are used as the parameters of the function;
   performing, based on the aggregate population of data points, one or more evolutionary processes to generate a sixth data point as a candidate for replacing the fifth data point in a second aggregate population of data points;
   determining a sixth error value indicative of how closely the function represents the test data when potential values represented by the sixth data point are used as the parameters of the function; and
   selecting, based on a comparison of the fifth error value and the sixth error value, either the fifth data point or the sixth data point for inclusion in the second aggregate population of data points.

7. The computer-implemented method of claim 1, wherein selecting either the first data point or the second data point for inclusion in the second population of data points is further based on a selection factor.

8. The computer-implemented method of claim 1, wherein the function maps the yield criteria as a boundary of a volume in a six-dimensional space and the output data includes one or more graphical representations of the volume.

9. The computer-implemented method of claim 1, wherein designating the plurality of data points to form the first population of data points includes randomly selecting points from a specified range of an N-dimensional space, where N is equal to a number of parameters of the function.

10. The computer-implemented method of claim 1, wherein performing the one or more evolutionary processes comprises:

selecting three distinct data points from among the first population of data points, the three distinct data points including the first data point, a first mutation reference data point, and a second mutation reference data point;

determining a difference vector indicating a first distance and a first direction between the first mutation reference data point and the second mutation reference data point;

determining, based on the difference vector, a mutation vector indicating a second distance and the first direction, the second distance less than or equal to the first distance;

determining a mutation data point corresponding to shifting the first data point by the second distance in the first direction; and setting each potential value represented by the second data point to a corresponding potential value represented by the first data point or a corresponding potential value represented by the mutation data point.

11. The computer-implemented method of claim 1, further comprising, based on the output data, designing or controlling a fabrication process to fabricate an object from the material.

12. The computer-implemented method of claim 11, wherein designing or controlling the fabrication process includes setting a fabrication process parameter based on the yield criteria.

13. A non-transitory computer-readable storage medium storing instructions that are executable by one or more processors to cause the one or more processors to perform operations including:

obtaining test data representing anisotropic material properties of a material;

performing a first evolutionary search process to identify parameters of a function descriptive of yield criteria of the material, wherein performing the first evolutionary search process includes, iteratively performing until an iteration criterion is satisfied:

designating a plurality of data points to form a first population of data points, each data point of the plurality of data points representing potential values of the parameters;

determining a first error value indicative of how closely the function represents the test data when the potential values represented by a first data point of the first population of data points are used as the parameters of the function;

performing, based on the first population of data points, one or more evolutionary processes to generate a second data point as a candidate for replacing the first data point in a second population of data points;

determining a second error value indicative of how closely the function represents the test data when potential values represented by the second data point are used as the parameters of the function; and selecting, based on a comparison of the first error value and the second error value, either the first data point or the second data point for inclusion in the second population of data points; and in response to determining that the iteration criterion is satisfied, generating output data based on estimated values of the parameters identified by performing the operations.

14. The non-transitory computer-readable storage medium of claim 13, wherein the instructions are executable concurrently by multiple processors to generate multiple sets of the parameters of the function and the operations further includes selecting the estimated values of the parameters from the multiple sets of the parameters.

15. The non-transitory computer-readable storage medium of claim 13, wherein the iteration criterion indicates a threshold error value.

16. The non-transitory computer-readable storage medium of claim 13, wherein the function maps the yield criteria as a yield surface and the output data includes one or more graphical representations of the yield surface.

17. A system comprising:

one or more processors; and one or more memory devices accessible to the one or more processors, the one or more memory devices storing instructions that are executable by the one or more processors to cause the one or more processors to perform operations including:

obtaining test data representing anisotropic material properties of a material;

performing a first evolutionary search process to identify parameters of a function descriptive of yield criteria of the material, wherein performing the first evolutionary search process includes, iteratively performing until an iteration criterion is satisfied:

designating a plurality of data points to form a first population of data points, each data point of the plurality of data points representing potential values of the parameters;

determining a first error value indicative of how closely the function represents the test data when the potential values represented by a first data point of the first population of data points are used as the parameters of the function;

performing, based on the first population of data points, one or more evolutionary processes to generate a second data point as a candidate for replacing the first data point in a second population of data points;

determining a second error value indicative of how closely the function represents the test data when potential values represented by the second data point are used as the parameters of the function; and selecting, based on a comparison of the first error value and the second error value, either the first data point or the second data point for inclusion in the second population of data points; and in response to determining that the iteration criterion is satisfied, generating output data based on estimated values of the parameters identified by performing the operations.

18. The system of claim 17, wherein the one or more processors include a plurality of processors configured to execute the instructions concurrently to generate multiple sets of the parameters of the function and the operations further includes selecting the estimated values of the parameters from the multiple sets of the parameters.

19. The system of claim 17, wherein the iteration criterion is satisfied responsive to a threshold number of iterations to being performed or responsive to an error value associated with the estimated values being less than or equal to a threshold error value.

20. The system of claim 17, further comprising a fabrication tool, the fabrication tool configured to control a fabrication process parameter based on the output data.

* * * * *